(12) United States Patent
Bienas et al.

(10) Patent No.: US 9,462,481 B2
(45) Date of Patent: *Oct. 4, 2016

(54) METHODS AND APPARATUS FOR CONFIGURATION OF FEMTOCELLS IN A WIRELESS NETWORK

(71) Applicant: APPLE INC., Cupertino, CA (US)

(72) Inventors: Maik Bienas, Cupertino, CA (US); Hyung-Nam Choi, Cupertino, CA (US); Andreas Schmidt, Cupertino, CA (US); Achim Luft, Cupertino, CA (US); Markus Mueck, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/929,635

(22) Filed: Nov. 2, 2015

(65) Prior Publication Data

US 2016/0057631 A1     Feb. 25, 2016

Related U.S. Application Data

(63) Continuation of application No. 14/514,997, filed on Oct. 15, 2014, now Pat. No. 9,191,839, which is a continuation of application No. 12/431,588, filed on Apr. 28, 2009, now Pat. No. 8,880,083.

(51) Int. Cl.
| | | |
|---|---|---|
| *H04W 24/02* | (2009.01) | |
| *H04W 72/04* | (2009.01) | |
| *H04W 16/18* | (2009.01) | |
| *H04W 88/08* | (2009.01) | |
| *H04W 24/00* | (2009.01) | |
| *H04W 28/18* | (2009.01) | |
| *H04W 84/04* | (2009.01) | |
| *H04W 84/18* | (2009.01) | |

(52) U.S. Cl.
CPC ............ *H04W 16/18* (2013.01); *H04W 24/02* (2013.01); *H04W 72/04* (2013.01); *H04W 88/08* (2013.01); *H04W 24/00* (2013.01); *H04W 28/18* (2013.01); *H04W 84/045* (2013.01); *H04W 84/18* (2013.01)

(58) Field of Classification Search
CPC . H04W 84/045; H04W 88/08; H04W 16/18; H04W 28/18; H04W 72/04; H04W 16/32
See application file for complete search history.

(56) References Cited

U.S. PATENT DOCUMENTS 8,248,923 B2 * 8/2012 Czaja .................. H04L 41/0806
                                                          370/229

* cited by examiner

*Primary Examiner* — Nam Huynh
(74) *Attorney, Agent, or Firm* — Fay Kaplun & Marcin, LLP

(57) ABSTRACT

Methods and apparatus that enable and optimize the simultaneous operation of several wireless femtocells having overlapping coverage areas. In one embodiment of the invention, a resource allocation (e.g., time-frequency grid for an OFDM or TDMA based wireless network) governs the simultaneous operation of several femtocells with overlapping coverage areas by specifying uses for resources. A resource allocation unit (RAU) entity is disclosed for managing and modifying resource allocations for femtocells. The community of femtocells can flexibly share resources according to the time-frequency grid, thereby maximizing spectral efficiency without requiring substantial network overhead.

20 Claims, 11 Drawing Sheets

METHODS AND APPARATUS FOR CONFIGURATION OF FEMTOCELLS IN A WIRELESS NETWORK

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communication and data networks. More particularly, in one exemplary aspect, the present invention is directed to enhanced methods and apparatus for wireless femtocell setup and operation.

2. Description of Related Technology

Universal Mobile Telecommunications System (UMTS) is an exemplary implementation of a "third-generation" or "3G" cellular telephone technology. The UMTS standard is specified by a collaborative body referred to as the $3^{rd}$ Generation Partnership Project (3GPP). The 3GPP has adopted UMTS as a 3G cellular radio system targeted for inter alia European markets, in response to requirements set forth by the International Telecommunications Union (ITU). The ITU standardizes and regulates international radio and telecommunications. Enhancements to UMTS will support future evolution to fourth generation (4G) technology.

A current topic of interest is the further development of UMTS towards a mobile radio communication system optimized for packet data transmission through improved system capacity and spectral efficiency. In the context of 3GPP, the activities in this regard are summarized under the general term "LTE" (for Long Term Evolution). The aim is, among others, to increase the maximum net transmission rate significantly in the future, namely to speeds on the order of 300 Mbps in the downlink transmission direction and 75 Mbps in the uplink transmission direction.

In the incipient version of the LTE specification (release 8), the 3GPP standards body will formalize requirements for a network element referred to as the "Home enhanced-NodeB" (HeNB). The Home eNodeB (HeNB) will be deployed for LTE based Radio Access Technology (RAT) networks; the HeNB is an evolution of the Home NodeB (HNB), which is its UMTS RAT predecessor. Both HeNBs and HNBs are femtocells that are optimized for use in residential, corporate, or similar environments (e.g., private homes, public restaurants, small offices, enterprises, hospitals, etc., and hence the term "home" is not meant to be limiting to residential applications). In the present context, the terms "Home Base Station", "Home NodeB" (for UMTS), "home eNodeB" (for LTE), and "femtocell" refer to the same logical entity, and are used interchangeably unless otherwise noted.

Femtocell Operation—

Generally speaking, a femtocell is a base station designed specifically for areas of limited coverage, to service a small number of users (e.g., small business and home environments). A femtocell augments the service provider's existing network of base stations by connecting to the service provider's network via a broadband interface (such as DSL, FIOS, T1, ISDN, or DOCSIS cable modem). Due to the smaller size and lower cost of a femtocell, they can be utilized in areas which are otherwise not feasibly serviced through standard base station deployments (e.g., by extension of indoor service coverage, or temporary service coverage). They also may be portable in nature, and accordingly be repositioned when desired with fairly minimal effort. Various aspects of femtocells are described in greater detail subsequently herein.

The random nature of femtocell deployments creates some unique challenges for network operators. Prior to the deployment of femtocells, base station networks were planned and controlled entirely by the network operator. Physical spectrum was easily controlled by a network operator with fixed base station allocations. In contrast to regular fixed base stations, femtocells are not planned, and in fact may widely vary in usage. Multiple femtocells may be operated simultaneously in a crowded area (e.g., an apartment complex, etc.) or in relative isolation (e.g., on a farm, etc.). Furthermore, the number of terminal devices supported by each femtocell is widely unpredictable, ranging from a single user (e.g., personal use), to many users (e.g., a coffee house). Accordingly, improved methods and apparatus are needed to efficiently manage spectrum allocation for random dispersions of femtocells.

Such improved methods and apparatus may also facilitate communal operation of femtocells. For example, a first femtocell which is operated in the immediate vicinity of other femtocells or macrocells should ideally identify usable spectrum, without substantially interfering with other concurrently operating femtocells.

Lastly, the improved methods and apparatus should preferably use minimal (if any) dialogue between the femtocell and the Core Network. Efficient network communication will greatly reduce the Core Network's processing burden for supporting widespread femtocell deployments.

SUMMARY OF THE INVENTION

The present invention satisfies the foregoing needs by providing, inter alia, methods and apparatus for femtocell operation and resource management within a wireless network.

In a first aspect of the invention, a method for selecting a configuration mode for a femtocell apparatus useful in a wireless network is disclosed. In one embodiment, the method includes: determining an occupational level of a plurality of radio resources; and if the occupational level of the plurality of radio resources includes at least one available radio resource, then entering a self-configuration mode. Otherwise, a network-based configuration mode is entered. The method is performed for example at startup or initialization of the femtocell.

In one variant of the method, the self-configuration mode enables the femtocell apparatus to find one or more available radio resources without exchanging messages with a core portion of the wireless network.

In another variant, the network-based configuration mode enables the femtocell apparatus to find one or more available radio resources by exchanging messages with the core portion of the network.

In yet another variant, the wireless network is a Long Term Evolution (LTE) cellular network, the femtocell apparatus is a HeNB, and the determination of an occupational level of a plurality of radio resources includes determining an occupational level of time and frequency resources associated with spectral access of the network.

In a second aspect of the invention, a method for reconfiguring a time-frequency grid in a wireless network comprising at least one femtocell apparatus. In one embodiment, the method includes: determining whether a change in level of resources is needed for the at least one femtocell apparatus; and instructing the at least one femtocell apparatus to utilize a resource for transmission of downlink signals in the wireless network based at least in part on the determination.

In one variant of the method, the instruction includes a message exchange between the at least one femtocell apparatus and a component on a core portion of the wireless network via a wired communications link.

In another variant, the instruction includes a message exchange between the at least one femtocell apparatus and one or more base station apparatus of the wireless network via a wireless communications link. For example, the wireless network may be a Long Term Evolution (LTE) cellular network, the femtocell apparatus a HeNB, the base station apparatus an eNB macrocell, and the message exchange via a wireless link includes sending at least one message between the HeNB and the eNB via a cellular air interface. Alternatively, the message exchange via a wireless link includes sending at least one message between the HeNB and the eNB via a WiMAX-compliant or other non-cellular air interface.

In another variant, determining whether a change in level of resources is needed for the at least one femtocell apparatus includes determining whether any resource conflicts exist between the femtocell apparatus and another base station apparatus currently operating within the network.

In a third aspect of the invention, a femtocell capable of operating within a wireless network is disclosed. In one embodiment, the femtocell includes: a processing device coupled to a memory; a wireless subsystem; a network interface subsystem in communication with a core portion of the wireless network; and a plurality of executable instructions resident within the memory. When executed by the processing device, the instructions cause the femtocell to: detect an occupation level of the available wireless network; select an operating mode from a self-configuration mode and a network-assisted configuration mode, reconfigure the wireless subsystem based at least in part on the selected operating mode, the reconfiguring being performed during femtocell operation. The selection is based at least in part on the detection of the occupation level, and the operating mode includes a definition of a resource grid identifying at least: (i) a shared resource for a first permanent downlink signal, (ii) a dedicated resource for a second permanent downlink signal, and (iii) a shared resource for a plurality of user data.

In a fourth aspect of the invention, resource allocation apparatus for use within a wireless network is disclosed. In one embodiment, the apparatus includes: a processing device coupled to a memory; a communications interface subsystem for communication with at least one femtocell of the network; and a plurality of executable instructions resident within the memory. When executed by the processing device, the instructions cause the apparatus to: receive a request for resource allocation from the at least one femtocell via the interface subsystem; access a stored data structure within the memory to determine whether the at least one requesting femtocell should be granted the requested resource; and generate a communication back to the requesting at least one femtocell indicating at least one of a grant or denial of the request.

In one variant, the apparatus is substantially co-located with a macrocell base station.

In another variant, the stored data structure contains data relating to a mapping or grid of time-frequency resources within the network.

In yet another variant, the resources comprise both dedicated resources and shared resources.

In a further variant, the communications interface subsystem includes a broadband wireless interface, and/or a cellular wireless interface.

In a still further variant, the apparatus further includes a broadband interface in communication with a core portion of the wireless network.

In a fifth aspect of the invention, femtocell apparatus configured for use in a cellular network is disclosed. In one embodiment, the femtocell apparatus includes logic configured to enable the femtocell apparatus to selectively implement either a substantially autonomous or network-based configuration process, the selective implementation allowing a consumer to operate the femtocell device in proximity to at least one other base station of the network without substantial interference therefrom and without particular knowledge thereof.

In another aspect of the invention, a computer readable apparatus is disclosed. In one embodiment, the apparatus includes a storage medium containing at least one computer program, the program having a plurality of instructions which when executed implement femtocell (e.g., HeNB) configuration in support of cellular operation supporting one or more UEs.

Other features and advantages of the present invention will immediately be recognized by persons of ordinary skill in the art with reference to the attached drawings and detailed description of exemplary embodiments as given below.

DETAILED DESCRIPTION OF THE INVENTION

Figure 1:
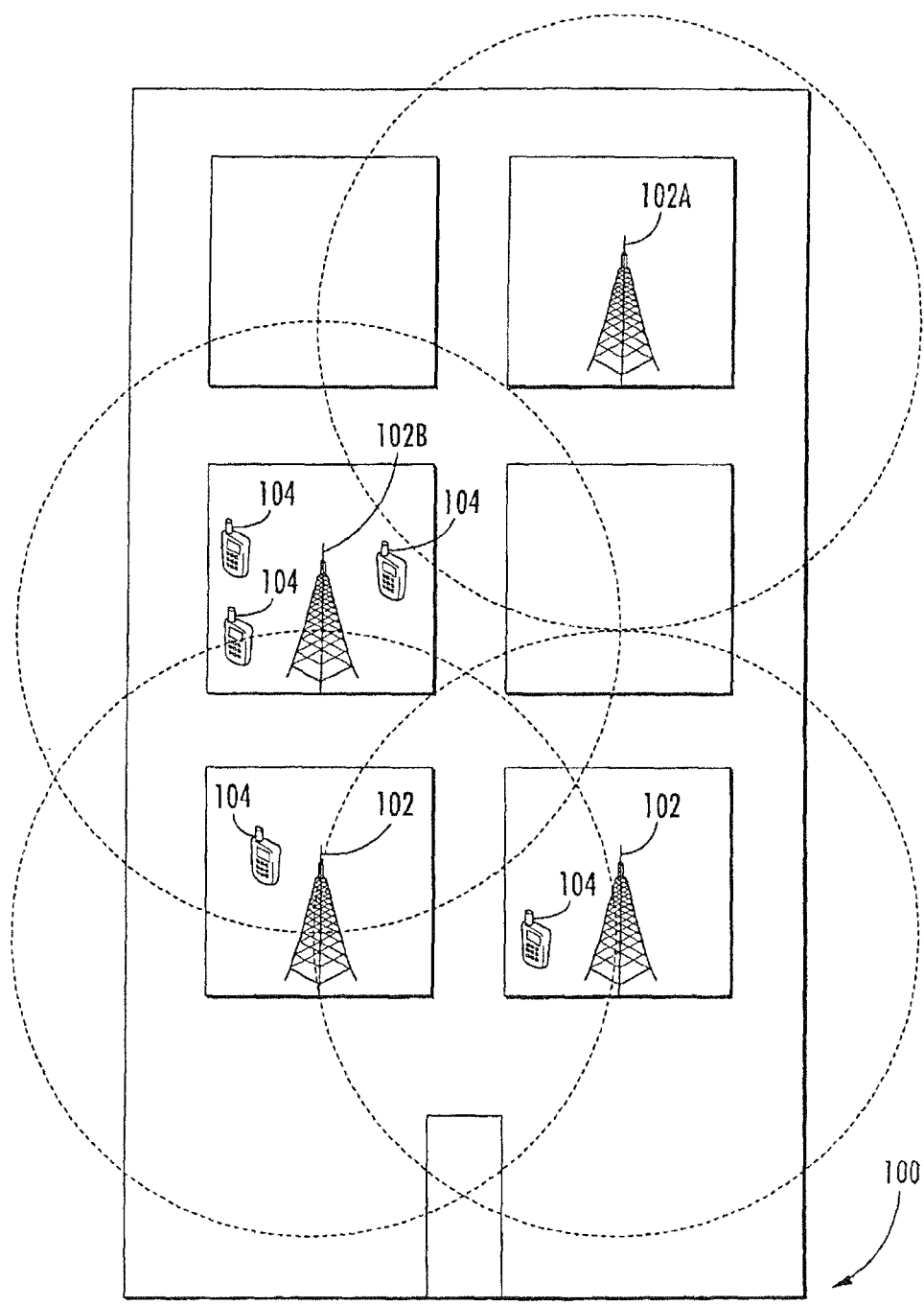
FIG. 1 is a graphical illustration showing one exemplary randomized deployment of LTE HeNBs.

Reference is now made to the drawings, wherein like numerals refer to like parts throughout.

Overview

The present invention provides, inter alia, methods and apparatus that enable a community of nodes of a wireless network (e.g., femtocells in a UMTS or LTE cellular network) to operate without interfering with one another, while also fully maximizing spectral resources and mitigating network overhead. In one aspect of the invention, a designated resource (e.g., time-frequency) "grid" or mapping is disclosed that governs the simultaneous operation of several femtocells with overlapping coverage areas. The time-frequency grid is flexibly configured to provide both dedicated resources and shared resources. Dedicated resources are rigidly assigned to one or more femtocells by a supervisory entity (e.g., a core network entity), whereas shared resources can be claimed and relinquished by any femtocell without substantial network overhead.

In another aspect of the invention, a multi-configuration mode femtocell is disclosed. In one embodiment, this femtocell may perform either self-configuration to identify available resources for its use, or alternately perform network-based configuration to request available resources for its use. In one variant, the femtocell may selectively switch between self-configuration and network-based configuration based on one or more parameters, such as for instance the detected usage of physical resources.

In one embodiment, the aforementioned femtocell performs standalone self-configuration when one or more physical resources are unused, and requests Resource Allocation Unit (RAU) assisted self-configuration when all physical resources are occupied.

In another embodiment, the femtocell receives configuration information via a wireless link, such as a cellular, microwave, satellite, or WLAN/WMAN connection.

In still another embodiment, the femtocell receives configuration information via a wireline or optical link, such as a DSL, FIOS, T1, or DOCSIS (cable modem) connection.

A resource allocation unit (RAU) entity is also disclosed for managing and modifying resource allocations for femtocells. In one embodiment, the RAU maintains a time-frequency grid that designates one or more channel uses to one or more time-frequency resources.

DETAILED DESCRIPTION OF EXEMPLARY EMBODIMENTS

Exemplary embodiments of the present invention are now described in detail. While these embodiments are primarily discussed in the context of a Home enhanced-NodeB (HeNB) operating within a Long Term Evolution (LTE) network, it will be recognized by those of ordinary skill that the present invention is not so limited, and may be applied to other types and configurations of networks. Moreover, while discussed primarily in the context of communication between a HeNB and a dedicated Resource Allocation Unit (RAU) resident to the network operator or nearby enhanced-NodeB (eNB), it is recognized that other implementations of mobile base station (e.g. femtocell, picocell, access point (AP), etc.) functionality or spectrum management functionality could be implemented at other points within the network in accordance with the invention.

In the following discussion, a cellular radio system includes a network of radio cells each served by a transmitting station, known as a cell site or base station. The radio network provides wireless communications service for a plurality of transceivers (in most cases mobile). The network of base stations working in collaboration allows for wireless service which is greater than the radio coverage provided by a single serving base station. The individual base stations are connected by another network (in many cases a wired network), which includes additional controllers for resource management and in some cases access to other network systems (such as the Internet) or Metropolitan Area Networks (MANs).

In LTE, there are two distinct types of base stations: eNodeBs (eNBs), and Home eNodeBs (HeNBs). In the present context, the terms "Home Base Station", "Home NodeB" (for UMTS), "Home eNodeB" (for LTE) refer generally to a "femtocell", and the terms "NodeB" and "eNodeB" (for LTE) refer generally to a "macrocell".

Femtocell Crowding—

In one exemplary usage case, a user of a mobile phone or other User Equipment (UE) might wish to augment their wireless coverage by deploying a HeNB in their premises (e.g., apartment, small business, corporate enterprise, hospital, etc.). In one scenario, the user employs a DSL, T1, ISDN, DOCSIS, or other such connection to connect the HeNB to the operator's Core Network. As previously described, HeNBs, and other femtocell type devices, benefit both the operator and the user. The user benefits from the improved indoor network coverage, as well as increased traffic throughput capabilities. Furthermore, the user's UE will have a longer standby battery life, because power consumption can be reduced due to the improved radio link quality (i.e., improved Signal to Noise Ratio (SNR)). The network operator obtains additional network coverage area (see, e.g., 3GPP Technical Report TR 25.820, "3G Home Node B Study Item Technical Report" v100 (Release 8), which is incorporated herein by reference in its entirety), as well as changes to Technical Standard TS 36.300 agreed in RAN3#61bis and RAN3#62-Chapter 4.6. 3GPP document number: R3-083577, the contents of which are also incorporated herein by reference in their entirety. Finally, both the home user and the network operator can fully utilize cellular equipment technology improvements, independent of the larger network capabilities and requirements for infrastructure upgrades.

Unfortunately, network management issues are greatly complicated with the unpredictability of user controlled femtocell operation. Femtocells may be randomly scattered geographically. HeNBs are portable for "nomadic" use, e.g., a user may operate the HeNB one day in his apartment, and the next day on a business trip in a hotel. Additionally, femtocells are not always operating. A HeNB may be unpredictably powered on or off at the user's discretion (e.g., switched on and off from at night, or when the user is not present). Lastly, femtocells vary widely in population density. For example, several HeNBs may operate concurrently in an apartment or hotel, whereas a home user may use a single HeNB in isolation.

FIG. 1 illustrates one exemplary "randomized" HeNB deployment 100, and the potential "crowding" problems that random distributions of HeNBs may cause. An apartment building has several HeNBs 102 located throughout with varying numbers of connected User Equipments (UEs) 104. Each HeNB 102 has a potential coverage area which may interfere with other HeNB's. In this exemplary case, a first HeNB 102A is serving no users, and is thus requires very little spectrum to operate, whereas a second HeNB 102B is serving multiple users, and may require significant amounts of spectrum. Ideally, the second HeNB 102B should be allocated a larger portion of the total spectrum resources than the first HeNB 102A.

To these ends, incipient LTE network standards will support varying bandwidths of 1.4 MHz, 3 MHz, 5 MHz, 10 MHz, 15 MHz, and 20 MHz to accommodate a wide range of different use scenarios. Furthermore, LTE networks will be based on highly configurable multiple access methods; i.e., Orthogonal Frequency Division Multiple Access/Time Division Multiple Access (OFDMA/TDMA) in the downlink direction and Single Carrier Frequency Division Multiple Access/Time Division Multiple Access (SC-FDMA/TDMA) in the uplink direction.

In prior art UMTS Terrestrial Radio Access (UTRA) systems, a Home NodeB (HNB) transmits locally measured network parameters to the HNB-Gateway. The HNB-Gateway responsively sends a configuration message back to the HNB. The configuration information includes assignments e.g., to a frequency band. In UTRA systems, the operator decides which spectral resources each femtocells should use.

Unlike prior art UTRA systems, the configurability of LTE enables multiple neighboring cells to share the same frequency band. However, neither extant nor proposed improvements to LTE specifications pre-suppose any methods for spectrum allocation; consequently, the network operator may freely manage its spectrum allocation however it chooses. For example, the network operator may choose to assign all eNodeBs (or HeNBs) the same frequency band, or alternately may assign each eNodeB (or HeNB) a separate frequency band.

Spectrum management for any significant number of HeNBs 102 is costly from the network operator's point of view for a number of reasons. First, unlike standard eNBs which provide service to many users over large areas, HeNBs 102 have very focused and localized areas of effectiveness for a relatively small number of users (even in a "dense" application such as an apartment building). In fact, allocating spectrum for HeNBs should be done sparingly, as HeNBs are generally unused most of the time. Secondly, unlike eNBs which are fixed structures with static environments, HeNBs may have constantly changing environments; thus, spectrum management for HeNBs is a constant and significant addition to the network operator's overhead.

Automatic setup procedures for registration and initial configuration of HeNBs are necessary due to, inter alia, the non-technical nature of HeNB consumers. The automated setup procedure will require message exchanges between the HeNB and the corresponding entities in the Core Network. Each HeNB may frequently request and return spectral resources (e.g., during power on/off, for nomadic operation, etc.). The number of deployed HeNBs is expected to be large, and will continue to grow in popularity over time. Consequently, even minor optimizations of HeNB/Core Network communications will have profound efficiency impacts.

Time-Frequency "Grid"—

Figure 2:
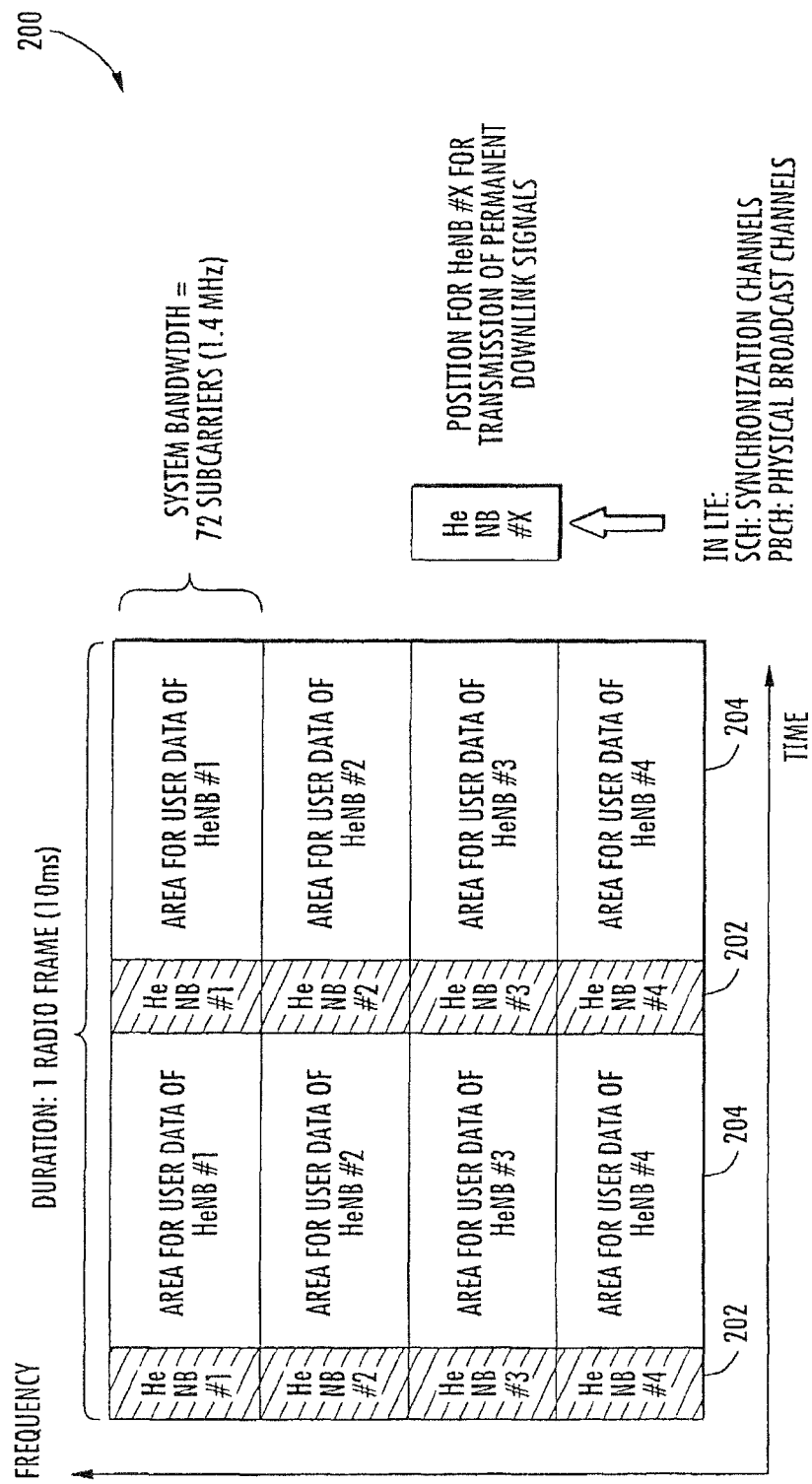
FIG. 2 is prior art graphical "grid" representation of time-frequency resources and their respective allocation to four HeNBs.

FIG. 2 illustrates one exemplary prior art time-frequency grid 200 used to allocate spectral resources to a number of HeNBs 102. The grid includes a first number of subcarriers transmitted over a radio frame (10 ms). Each HeNB is allocated a dedicated portion of the time-frequency grid. In the prior art system shown, each HeNB has a system bandwidth of 1.41 MHz (72 subcarriers). The entire system's radio resources (e.g. 300 subcarriers) may also have a number of guard bands or slots distributed throughout, to minimize interference. The HeNBs further divide their physical allocation into a permanent dedicated downlink portion 202, and a dedicated user data portion 204. The dedicated permanent downlink portion is reserved for signals and channels that are transmitted by a HeNB when no radio link to any UE is established e.g., Synchronization Channels (SCR), and Physical Broadcast Channels (PBCH). The dedicated user data portion is used for signals and channels that are transmitted between a HeNB and one or more UEs 104.

Referring back to the exemplary FIG. 1, the prior art distribution of spectral resources shown in FIG. 2 is inefficient for the randomized HeNB deployment 100 of FIG. 1. The first HeNB 102A is not occupied, and would be completely under-utilized, while still reserving a significant amount of available bandwidth for dedicated permanent downlink signaling 202 and dedicated user data 204. Conversely, the second HeNB 102B is inundated with several users, and its spectral usage is at or above reasonable capacity.

In view of the prior art deficiencies, improvements to radio resource allocations may be enabled by subdividing the radio resources into logical groups. In one exemplary embodiment, radio resources are categorized into (i) permanent downlink signals, or (ii) transmission of user data. Furthermore, each radio resource may be shared or dedicated. The radio resources are handled differently based at least in part on their categorization.

In the following discussions it is appreciated that a time-frequency grid is provided for the purposes of illustration. In OFDM based systems, the radio resources are divided in time (timeslots) and frequency (subcarriers). In other systems, other types of radio resources may be used. For example, in a CDMA based system, the radio resources are divided in time and code space; accordingly, a time-code grid could be defined. Accordingly, as used herein, the terms "resources", "radio resources" and "physical resources" refers to any unit of transmission media recognized throughout the wireless arts, including time slots, frequency bands, codes, subcarriers, etc.

In one exemplary aspect of the present invention, several HeNBs 102 may be operated simultaneously in the same frequency range, with minimal configuration from the Core Network. The resource (e.g., time-frequency) grids of the exemplary embodiments of the invention are not fixed in allocation, but instead may be flexibly adapted based on HeNB and UE 104 requirements. The following four (4) examples of time-frequency grids shown in FIGS. 3-6 illustrate various advantageous aspects of flexible operation.

Figure 3:
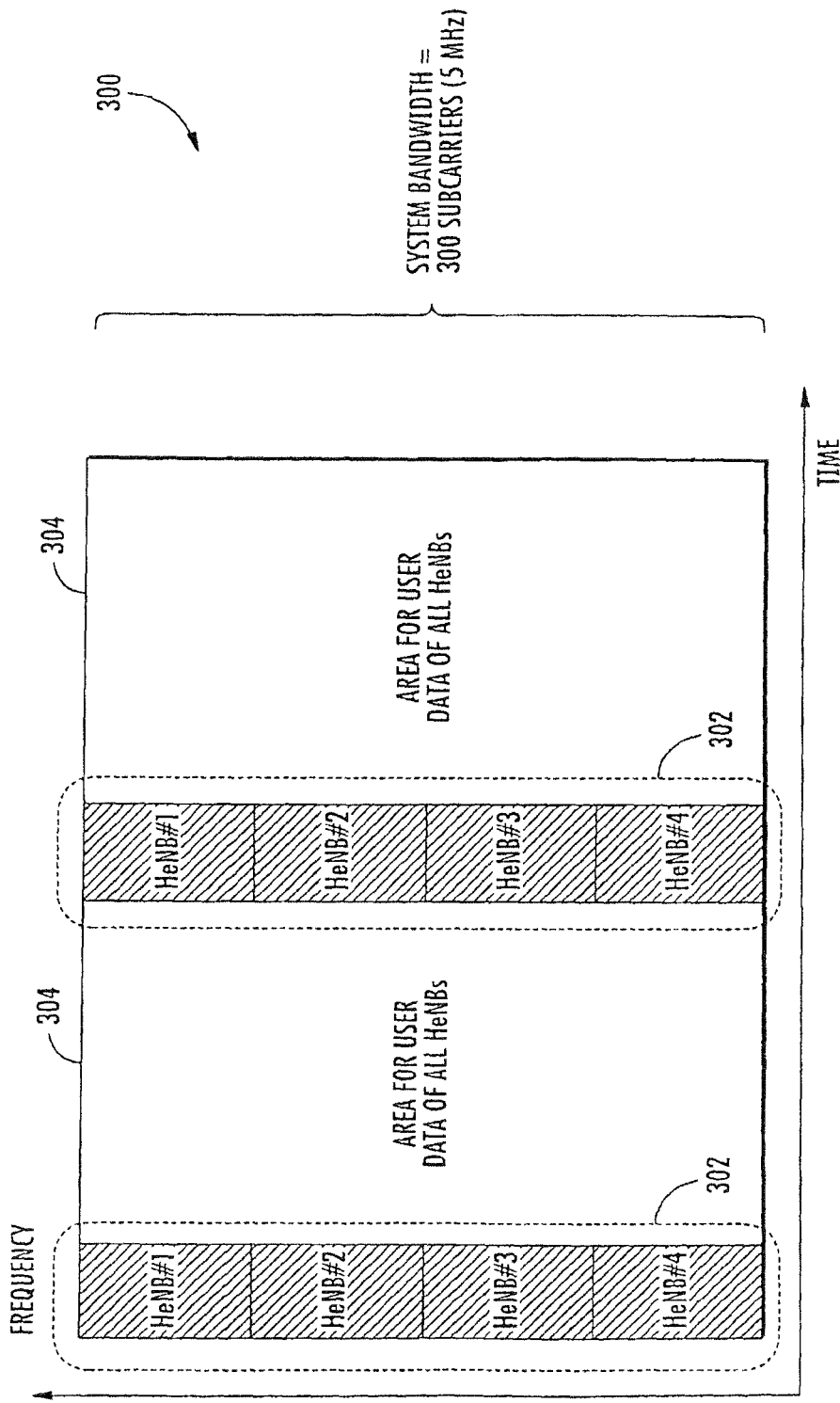
FIG. 3 is a graphical representation of a first exemplary embodiment of a time-frequency grid according to the invention, the grid divided into shared resources allotted for the permanent downlink signaling of four (4) HeNBs, and flexible data usage areas.

In contrast to FIG. 2, FIG. 3 illustrates a first exemplary embodiment of a time-frequency grid 300 according to the invention which flexibly allocates spectral resources to four (4) HeNBs 102 with overlapping coverage areas. The time-frequency grid 300 is separated into at least two (2) areas:

one area with shared resources for permanent downlink signals 302, and one or more flexibly configured areas 304 (e.g., dedicated or shared, uplink or downlink, user specific or broadcasted, restrictions, etc.).

Figure 4:
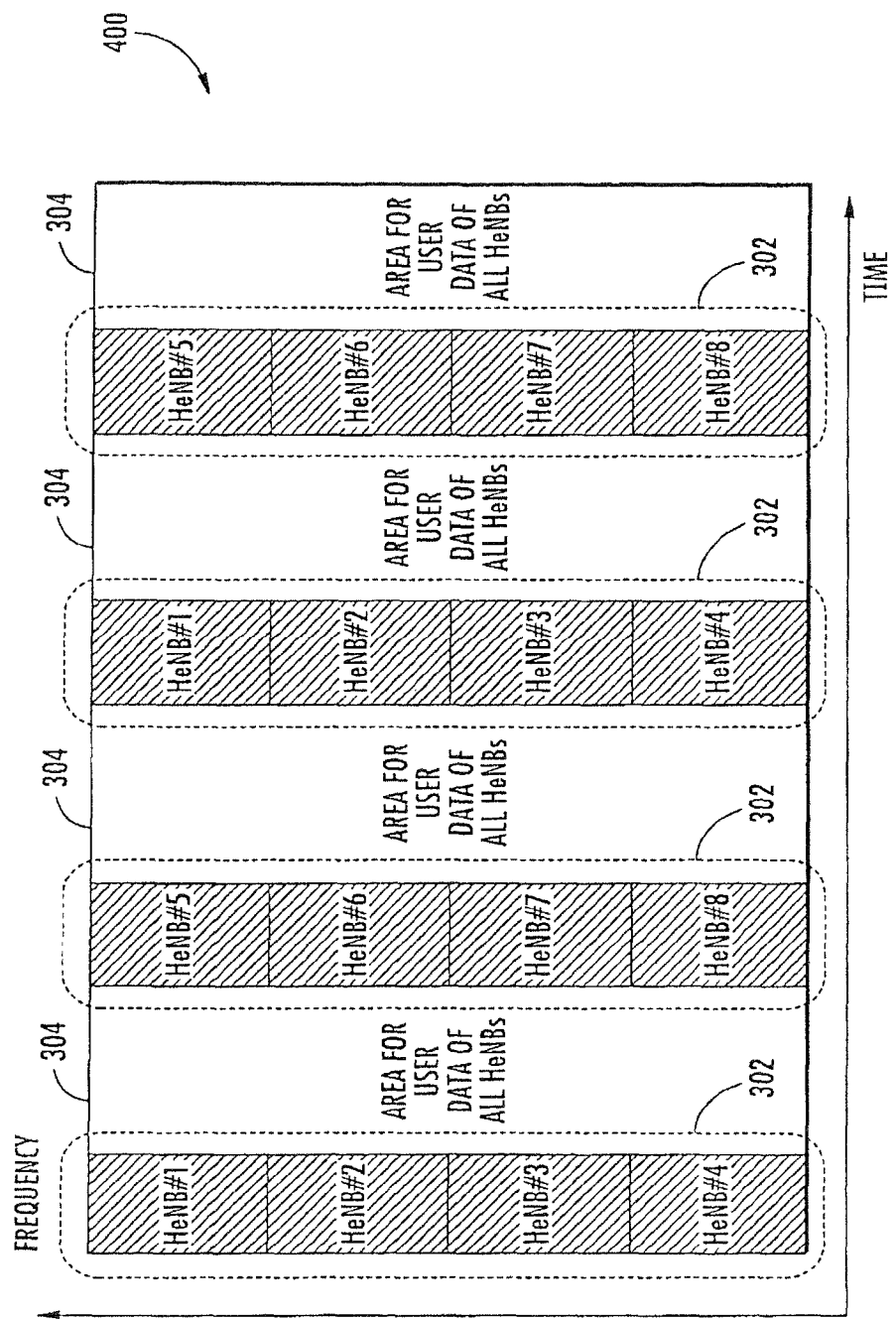
FIG. 4 is a graphical representation of a second exemplary embodiment of a time-frequency grid according to the invention, the grid divided into shared resources allotted for the permanent downlink signaling of eight (8) HeNBs, and flexible data usage areas.

FIG. 4 illustrates a second exemplary time-frequency grid 400 which flexibly allocates spectral resources to eight (8) HeNBs 102 with overlapping coverage areas, in accordance with at least one aspect of the present invention. Similar to the first time-frequency grid 300 of FIG. 3, the second time-frequency grid 400 is separated into at least two (2) areas: one area with shared resources for permanent downlink signals 302, and one or more flexibly configured areas 304 (e.g., dedicated or shared, uplink or downlink, user specific or broadcasted, restrictions, etc.). However, the second time-frequency grid 400 has allocated resources for permanent downlink signaling 302 preferentially over flexible configuration areas 304, and may accordingly support twice the number of HeNBs.

Figure 5:
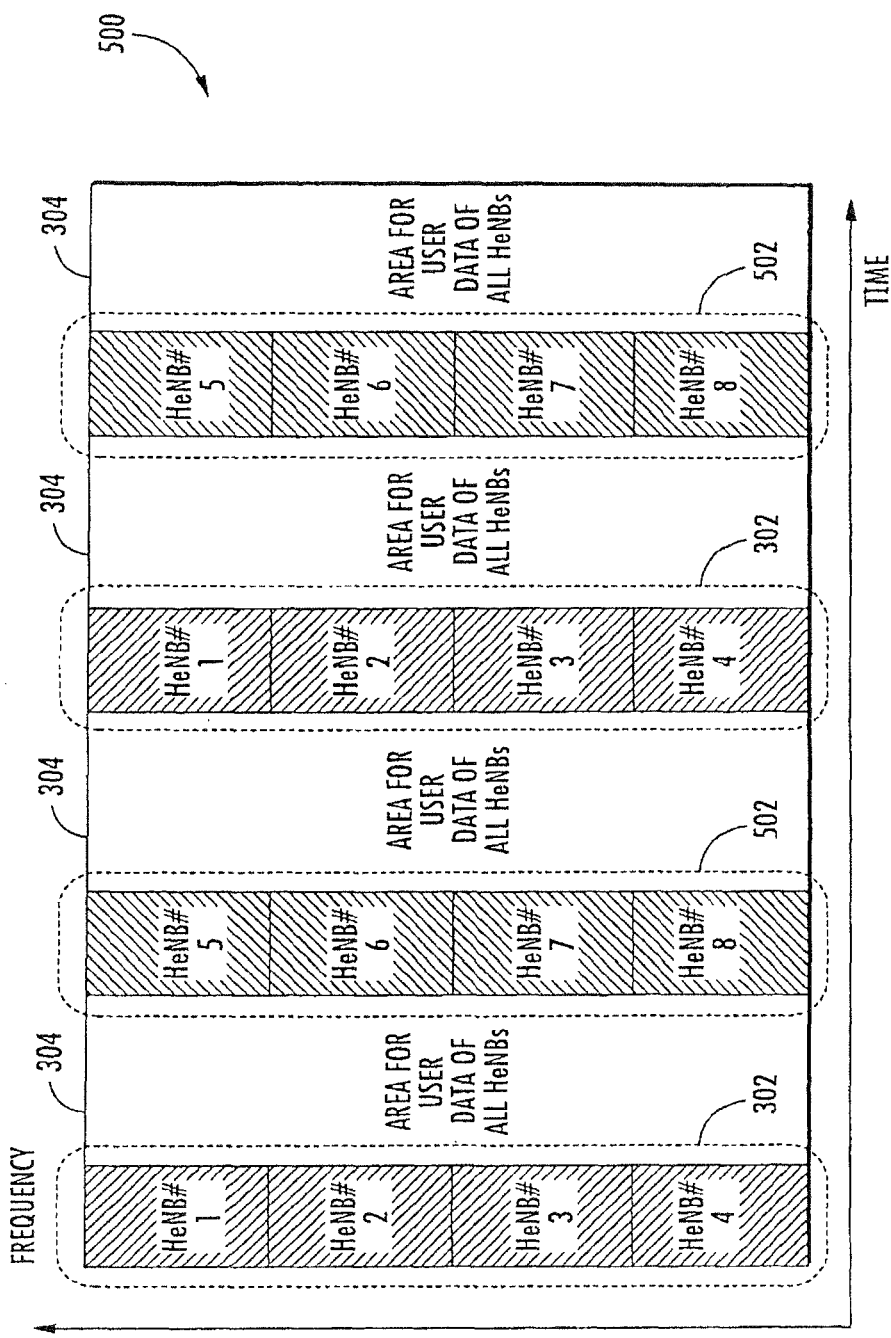
FIG. 5 is a graphical representation of a third exemplary embodiment of a time-frequency grid according to the invention, the grid divided into: (i) shared resources allotted for the permanent downlink signaling of four (4) HeNBs, (ii) dedicated resources allotted for the permanent downlink signaling of four (4) HeNBs, and (iii) flexible data usage areas.

FIG. 5 illustrates a third exemplary time-frequency grid 500 which flexibly allocates spectral resources to eight (8) HeNBs 102 with overlapping coverage areas, in accordance with the present invention. Unlike the first and second time-frequency grids (300, 400) described above, the third time-frequency grid 500 is separated into at least three (3) areas: (i) one or more areas with shared resources for permanent downlink signals 302, (ii) one or more areas with dedicated resources for permanent downlink signals 502, and (iii) one or more flexibly configured areas 304 (e.g., dedicated or shared, uplink or downlink, user specific or broadcasted, restrictions, etc.). The third time-frequency grid 500 has allocated preferential dedicated resources 504 to a subset of the HeNBs providing a higher level of service (as will be explained subsequently herein), compared to the typical shared resources 302.

The following discussions are intended to illustrate, rather than limit, the various possible types of resources, used throughout.

In one embodiment of the invention, a shared resource can be requested and granted to one or more HeNBs 102 without interaction from the Core Network. Shared resources shift the burden of resource allocation from the operator's Core Network to one or more localized entities e.g., eNBs and or HeNBs. In contrast to shared resources, a dedicated resource can be used by a HeNB only when the HeNB is explicitly assigned to the resource by an RAU or other entity. Dedicated resources are not shared with other HeNBs, and there is no arbitration or negotiation required for operation. Accordingly, any HeNB that is instructed to use a dedicated resource can be operated with a guaranteed level of service. In some cases, such minimum guaranteed level of service may be useful for prioritizing HeNBs, such as for use with certain business methods or paradigms, and/or operation with various governmental agencies. In one exemplary embodiment, HeNBs may be allocated shared or dedicated radio resources for permanent downlink signaling.

In one related variant, several areas of the time-frequency grid are additionally allocated for shared user data. For example, several HeNBs may allocate a shared subset of resources, for transmitting user data. In one exemplary case, several HeNBs may share a subset of resources for transmission of user data to UEs, or for reception of user data from UEs. Such shared user radio resources minimize inefficiencies caused by the reservation of radio resource during idle or low usage periods.

Various other restrictions may be imposed on resources. For example, an uplink or downlink restriction would limit a resource to unidirectional operation, either UE 104 to HeNB 102 (i.e., uplink), or HeNB to UE (i.e., downlink). In another example, resources may be restricted to unicast (i.e., single user), multicast (i.e., multiple users), or broadcast operation (i.e., any user) operation.

Other restrictions may be imposed to guarantee certain levels of service or QoS. For example, resources may have various levels of latency (e.g., transmission delay), or throughput (e.g., average rate of delivery). In other examples, resources may include a minimum guaranteed data rate, or a maximum data rate allowed. Such restrictions may be particularly useful in combination with a RAU, whereby the RAU may dynamically alter the time-frequency grid allocations to "fine tune" various network optimizations.

Furthermore, each of the foregoing restrictions may be used in combination with one another. For example, a resource could be restricted to a shared downlink broadcast resource having a maximum data rate (as may be useful in e.g., advertisements or other lower-bandwidth traffic). In another example, a dedicated unicast resource may require a guaranteed minimum data rate (as may be particularly useful for supporting emergency or 911 calls).

Figure 6:
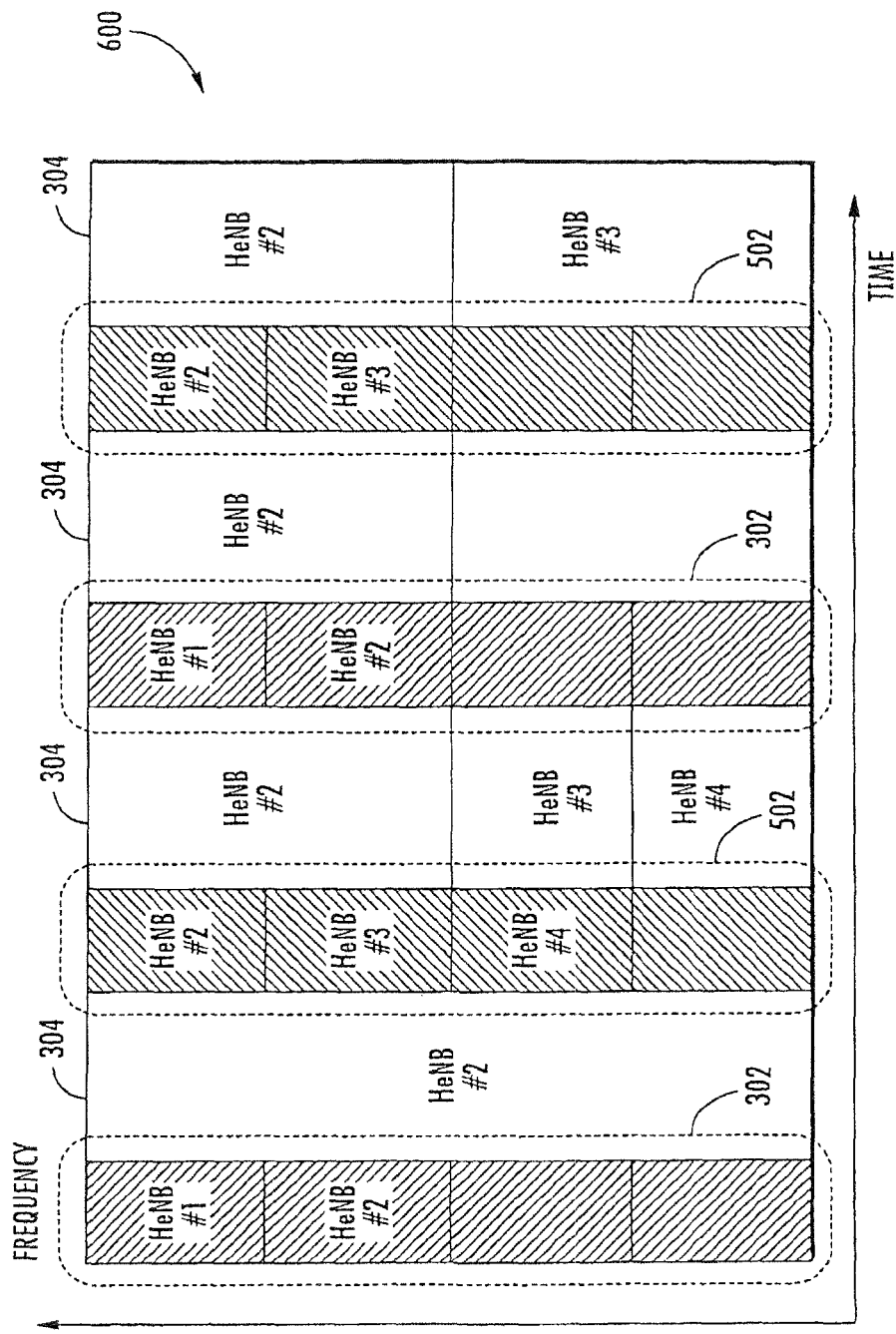
FIG. 6 is a graphical representation of a fourth exemplary embodiment of a time-frequency grid according to the invention, overlaid with exemplary time varying resource allocations for both permanent downlink signaling and data usage.

FIG. 6 illustrates the dynamic resource allocation capabilities of one exemplary time-frequency grid 600 having one or more flexible data usages. The first HeNB 102 is not occupied, and does not occupy any dedicated resources for downlink permanent signaling 502; however it still maintains a shared resource for the transmission of its permanent downlink channels (SCH, and PBCH) 302. The relatively low usage of the first HeNB can be accommodated with shared time-frequency resources. The second HeNB is servicing multiple UEs 104, and has reserved significant portions of spectral resources (both shared and dedicated). The third and fourth HeNBs have divided a portion of the remaining bandwidth in both time and frequency as shown, each maintaining a dedicated channel for permanent downlink signaling 502, but dynamically negotiating a shared resource for data needs 304. Lastly, a section of the remaining bandwidth is unused. The unused bandwidth may be necessary, inter alia, to guard against neighboring device interference, to reserve some amount of excess capability to smooth between periods of transition, etc. Thus, the dynamic resource allocation capabilities of the time-frequency grid 600 of FIG. 6 advantageously enables efficient utilization of precious spectral resources for femtocells.

In the following discussions, complementary methods and apparatus are described for a network entity (e.g., LTE Resource Allocation Unit (RAU)) which: (i) negotiates, configures, and manages a resource grid (e.g., allocations for flexibly managed user data, and shared permanent downlink signals, etc.). The following elements and steps are described in the context of distributing and managing time-frequency resources of a time-frequency grid for use with an OFDMA/TDMA radio access technology, although it will be appreciated that the present invention is in no way limited to these spectral access techniques.

Methods—

Figure 7:
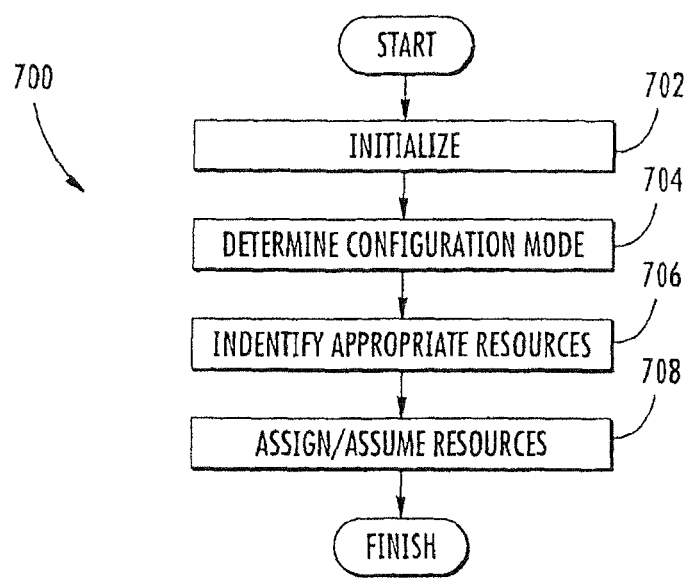
FIG. 7 is a logical flow diagram of an exemplary embodiment of the generalized process for requesting resources for radio operation in accordance with the principles of the present invention.

Referring now to FIG. 7, a generalized setup procedure 700 for allocating radio resources for one or more radio devices (e.g., femtocells) is illustrated.

At the first optional step 702, a device (femtocell) is first powered on, and internal settings within the femtocell are initialized. The initialization of internal settings may generally include booting the software, as well as any resetting of hardware settings within the femtocell itself. During initialization, the femtocell also establishes a network connection with the Core Network entity for initial authentication, authorization and accounting. This may comprise negotiating and establishing a connection over the access medium of choice; e.g., DSL over copper wire, FIOS, cable modem, etc. Upon establishing the network connection, the femtocell notifies the Core Network entity of its presence, and optionally its operational status. In order to perform this step, one embodiment of the femtocell retrieves from a computer-readable media (e.g., HDD, ROM or flash memory) the address and protocol for connecting to the Core Network entity. In one variant, this includes use of a TCP/IP transport over the aforementioned access medium, although other transports and protocols may be used with equal success (e.g., over a WiMAX link).

In one exemplary embodiment, when a femtocell powers on, a security procedure is automatically executed for the femtocell to securely connect to the Core Network. Some minimal requirements are imposed, comprising Internet Protocol (IP) security, authentication, and authorization. IP security must be established for bearer traffic to be carried over an untrusted or public network such as the Internet. Authentication and registration with the Core Network ensure that the femtocell is a valid device, and not "spoofing" or otherwise attempting to trick the Core as to its identity. The femtocell must be authorized to provide service through the service provider. It will be appreciated that Other security measures known to those of ordinary skill in the art may be employed as well including e.g., encryption of all or a portion of the data being transmitted so as to protect data confidentiality, and cryptographic residue (hash) generation to provide integrity protection.

It is appreciated that in other embodiments, the initialization step 702 may be entirely unnecessary. For example, in some cases, the femtocell may already be initialized (e.g. such as during a periodic scan, a user-initiated refresh scan, etc.). Thus, in one alternate embodiment, a femtocell may have an existing connection to the Core Network which periodically provides updated network parameters. In one variant, the existing connection is a secure connection to the Core Network via an IP network.

At step 704, the femtocell determines its configuration mode. In one embodiment, the femtocell selects from a plurality of configuration modes. The selection of configuration mode (from the plurality of configuration modes) may be controlled from either the (remote) network entity, or alternatively may be determined internally by the femtocell itself. In other embodiments, a combination of entities could be used to initialize the configuration modes (e.g., receiving location identification from the network entity as well as looking up configuration modes from an internal memory local to the femtocell). In yet other embodiments, the femtocell may dynamically change its mode (e.g., a first femtocell may start in a first configuration mode as a standalone entity, and later discover a second femtocell with cooperative capabilities; the first femtocell may then switch to a cooperative configuration mode).

In one exemplary implementation of step 704 (discussed in greater detail with respect to FIG. 8 subsequently herein), the plurality of configuration modes includes at least two distinct modes of selection. A first "self configuration" mode enables a femtocell to find usable resources autonomously, and may reduce or obviate the need to exchange messages with the Core Network. A second "network configuration" mode enables one or more network entities to re-configure the time-frequency or other resource grid to assign resources to the femtocell. In some embodiments, such network configuration is additionally performed at a network entity, the latter which may operate semi-autonomously to the Core Network (e.g. a nearby macrocell with resource allocation capabilities). This semi-autonomous approach advantageously provides desirable aspects of both of the other approaches; i.e., relieving the Core Network of undue overhead burden, abut with at least some degree of cooperation or consideration of resource allocations to other devices within the network.

According to its selected configuration mode, the femtocell identifies one or more resources which are suitable for desired signaling (step 706). Lastly, at step 708, the femtocell is assigned control or assumes control of the physical resource.

Exemplary LTE Home eNodeB (HeNB) Methods—

Figure 8:
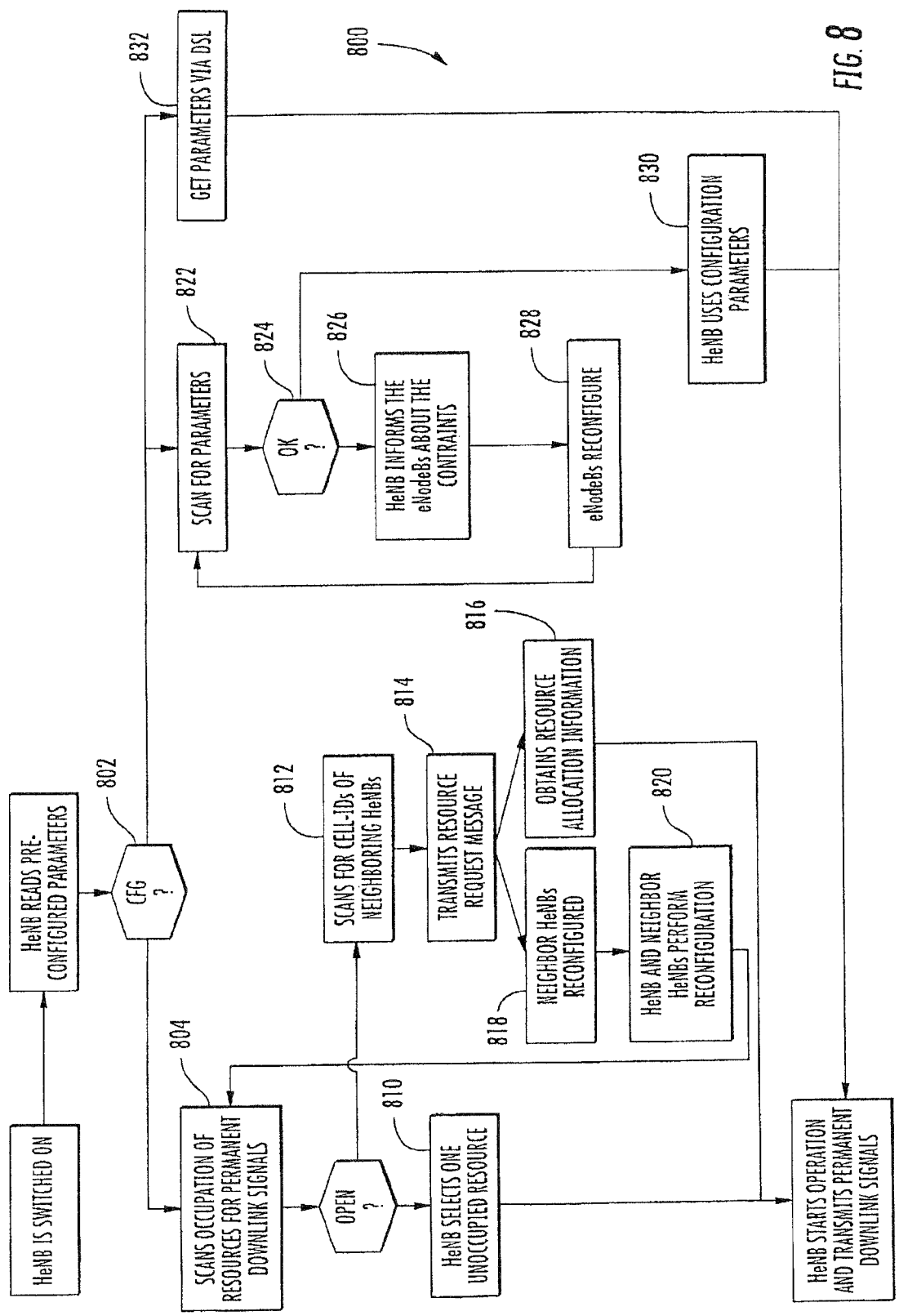
FIG. 8 is a logical flow diagram of one exemplary embodiment of a method for assigning resources to a HeNB operating in a LTE Radio Access Network (RAN), in accordance with the principles of the present invention.

FIG. 8 illustrates one exemplary configuration mode selection and resource identification process 800 for permanent downlink signaling of a HeNB e.g., SCH and PBCH for LTE network operation. In this exemplary embodiment, the HeNB may select its configuration mode generally from two categories: (i) self-configuration modes, or (ii) network-based configuration modes. The self-configuration modes in the illustrated embodiment comprise a first "standalone self-configuration" mode, and a second "RAU assisted self-configuration" mode. The network-based configuration modes comprise in this embodiment two additional modes; i.e., a third "wireless network-based configuration" mode, and a fourth "wire-line network-based configuration" mode. These modes are summarized in Table 1 below. It will be recognized, however, that more or less modes (and sub-types) may be used consistent with the invention, the foregoing merely illustrative.

TABLE 1

| Mode Type | Sub-Type 1 | Sub-Type 2 |
| --- | --- | --- |
| Self-configuration | Standalone | RAU-assisted |
| Network-Based Configuration | Wireless | Wireline |

Furthermore, while the foregoing set of configuration modes are identified by certain characteristics associated with each mode, it is readily appreciated that any of the procedural characteristics could be intermixed, augmented, or obviated in other implementations, or technologies.

In one exemplary LTE network, a HeNB obtains one or more preconfigured parameters for radio setup. These basic parameters may have been stored in the HeNB, obtained through signaling from neighboring eNBs or HeNBs (e.g., in the system information or SI), obtained from a third party entity, or directly messaged from the Core Network to HeNB (e.g. via DSL, DOCSIS, etc.). This information may include for example the frequency range to be used by the HeNB, and the current time-frequency positions of the permanent downlink signals of neighboring HeNBs occupying shared resources. Dedicated resources for any HeNB are in one embodiment always restricted as to other HeNBs or entities, although the term "dedicated" here can include conditional dedication if desired (e.g., dedicated except as to a particular condition or set of conditions).

In the exemplary embodiment of the method 800 of FIG. 8, at step 802, the HeNB either selects self-configuration, or network-based configuration based at least in part on the preconfigured parameters. In self-configuration mode, the HeNB will attempt to identify one or more sufficient resources autonomously, but may occasionally or incidentally request assistance from network entities.

In network-based configuration mode, the HeNB directly interfaces with one or more network entities to request and configure a resource allocation (e.g., time-frequency grid) to support the HeNB. Network-based configuration may be performed via either a wired interface (such as a DSL, T1, etc. connection to the Core Network), or a wireless interface (such as for example being broadcast over cellular frequency spectrum as part of the system information from surrounding eNodeBs).

In one variant, selection of configuration modes is based on the occupation level of the available resources. For example, if at least one resource of which the HeNB is aware is available, the HeNB will use self-configuration mode, whereas if all resources are occupied, the HeNB will use network-based configuration mode. Other schemes may be applied as well, such as those based on a predetermined hierarchy (e.g., try X, and if X not available try Y, etc.), or examination of one or more operational parameters before making a decision on which mode to select. Such selection logic can be implemented using a computer program, hard-coded into the HeNB apparatus, or combinations thereof as will be recognized by those of ordinary skill.

If the HeNB is pre-configured for self-configuration, then at step 804, the HeNB determines the occupation level of physical resources. The HeNB may scan only a subset of all resources (e.g., only the resources used by a preferred network operator, portion of a network, portion of the resource "space" such as a fraction of a frequency spectrum, a certain frequency range at a certain time instance with a certain spreading code, etc.), or may perform a full scan of all resources which may be used for HeNB operation. Such scans can also be randomized across different HeNBs so as to prevent multiple HeNBs from instituting the same logic at startup simultaneously.

If sufficient available resources are available, then the HeNB may enter standalone self-configuration. If the HeNB identifies insufficient available resources, then the HeNB will proceed with RAU assisted self configuration.

In one specific embodiment, the HeNB performs a scan for neighboring synchronization signals over the configured frequency range. If the HeNB detects that at least one shared resource is available, then the HeNB selects an open shared time-frequency resource for transmission of permanent downlink signals (e.g. SCH). If however, the HeNB cannot detect any available shared resources suitable for its permanent downlink signaling, then the HeNB uses a RAU assisted self configuration mode to identify dedicated resources, and or free additional shared resources suitable for its permanent downlink signaling.

Alternatively, if the HeNB selects network configuration, the HeNB may select or be preconfigured for wireless, or wire-line configuration. In one wireless embodiment, neighboring eNBs (macrocells) broadcast configuration information; the new HeNB (femtocell) receives the broadcasted information and adjusts its behavior accordingly. In one variant, the HeNB may actively negotiate with one or more eNBs to identify appropriate configuration information. In yet another variant, the HeNB may actively negotiate with one or more HeNBs to identify appropriate configuration information. For example, several femtocells operated in the same area (e.g. a college campus, condominium complex, etc.) may retain a "master femtocell" which assigns resources to "slave femtocells". All slave femtocells would require a specialized connection to the "master femtocell" e.g., a separate wired or wireless interface.

In one wire-line embodiment, the HeNB requests information from a RAU. The RAU is accessed through the previously established network connection. In one variant, the HeNB connects to an RAU via the previously established central Core Network connection. In another such variant, the HeNB identifies a localized RAU based on a message encapsulated within a system broadcast; for example, a RAU hosted by a nearby eNB broadcasts a secure address for access.

Each of the foregoing modes is now described in further detail.

Firstly, referring to the various self configuration modes, a HeNB will use the standalone self configuration if sufficient available resources are detected at step 804. At step 810, the HeNB selects one or more of the identified unoccupied shared physical resources for its permanent downlink signals. The standalone self configuration mode does not actively negotiate or exchange any messages with any RAU.

In one variant, a HeNB which initializes itself in standalone self configuration may frequently re-evaluate its environment and requirements. For example, upon the arrival of a new HeNB to its coverage area, the first HeNB may reassess its configuration mode, including potentially transitioning to networked configurations, to maximize resource utilization.

In some embodiments, a HeNB which is operating in complete isolation may additionally execute a localized RAU. In such embodiments, the HeNB will assume control over all physical resources, and provision access to HeNBs which are powered on in its coverage area in the future.

If the HeNB attempts self configuration but cannot identify sufficient resources for shared operation at step 804, then the HeNB initiates communications with a RAU. The RAU is accessed through the previously established network connection (e.g., an authenticated DSL connection).

At step 812, the HeNB identifies its neighboring cells. In one embodiment, the HeNB executes a scan for cell IDs. In an LTE system, the Broadcast Control Channel (BCCH) is broadcast constantly from both HeNBs and eNBs. The BCCH is a unidirectional channel which carries information necessary for identifying and initiating a communication channel to the cell. The BCCH transmit power is constant, but environmental factors may affect signal reception (RF interference, geography, weather-induced or Rayleigh fading, etc.). Therefore, received signal strength (e.g., RSSI) of the BCCH can be used as a rough estimation of proximity. Parameters that are transmitted on the BCCH may include a listing of frequencies, cell ID, power control and discontinuous transmission (DTX) information. Also, the Public Land Mobile Network identification (PLMN ID) to which that cell belongs is encapsulated in the system information transmitted on the BCCH. The PLMN ID is a concatenation of the Mobile Country Code (MCC) with the Mobile Network Code (MNC) and Location Area Identity (LAI), although it will be recognized that these protocols are merely exemplary in nature, and others may be used in conjunction with or in place of the foregoing, consistent with the invention.

At step 814, the HeNB transmits a request for radio resource(s) to the RAU. The RAU may be located in the Core Network, or alternatively may be located at a nearby eNB or other location. Accordingly, in one embodiment, the request is transmitted via the previously established network connection to the RAU. In one variant, the request is transmitted to the Core Network, and forwarded to a RAU entity. Alternately, the request may be transmitted to the Core Network, prompting a response containing an address for one or more RAUs (which the HeNB may directly connect to). In another such variant, the HeNB scans a nearby eNB, and determines an appropriate address by decoding one or more system information elements.

The resource request message includes a listing of cell IDs of neighboring cells (e.g., eNBs, and or HeNBs), identified in step 812. In another embodiment, to maintain compatibility with other systems, the resource request message may be separated into two or more separate messages; e.g., one for a resource request, and another message detailing the list of cell IDs detected.

In one embodiment, responsive to the resource request, the RAU may transmit resource allocation information directly to the HeNB. The HeNB can than proceed to select one or more of the identified physical resources for its permanent downlink signals (step 816). The identified resource allocation information may be either a dedicated resource, or a new shared resource. In some cases, the RAU may require negotiation with other entities to reclaim one or more resources (e.g., negotiations with one or more HeNBs to reassess and reclaim appropriate resources). For example, in one alternative embodiment, responsive to the resource request, the RAU may transmit resource allocation information directly to the HeNB, and neighboring HeNBs (step 818). The community of HeNBs then performs a reconfiguration (step 820).

Referring now to the network configuration modes (right side of FIG. 8), if the HeNB selects wireless network configuration, then at step 822, the HeNB identifies its neighboring cells. In one embodiment, the HeNB executes a scan for neighboring eNBs. Once the HeNB has identified its neighboring cells, the HeNB can determine resource allocation information by decoding system information (SI) broadcasted on the control channel (BCCH), or obtained from another source.

The HeNB first identifies resource assignments from each neighboring eNodeB. The HeNB compares the operational resource allocations from each of the eNodeBs, and determines (based on the constraints from each of the eNodeBs) if an overlapping domain is available (step 824). For example, one possible "conflict" may occur when a first eNB having a first time-frequency grid does not have any overlapping shared resource areas with a second eNB's second time-frequency grid. Such a situation may arise for example, when two neighboring cells have cellular coverage within range of the new HeNB, but do not overlap coverage with one another (i.e., are not aware of any conflict).

If the combined wireless resource allocation has contradicting resource information, then the HeNB may either (i) request a reconfiguration of the identified neighboring cells by providing conflict information to each eNB (step 826), or (ii) the HeNB may select one eNB which is responsible for resource allocation.

At step 826, in response to the request for reconfiguration, one or more RAUs reassign resources for at least a subset of the identified neighboring cells. The first and second eNBs may opt to coordinate (e.g., the second eNB assumes the first time-frequency grid, or vice-versa), or compromise on their respective allocations (e.g., the first and second eNB assume a new third time-frequency grid). Such mediation may be performed by an RAU located at either the Core Network, or in some cases, an RAU located in one of the affected eNBs. Accordingly, at step 828, the community of cells reconfigures their resource allocations, and the community resumes normal operation.

Alternately (not shown), the HeNB may select one eNB which is responsible for resource allocation. The selection may be based on a variety of criteria; e.g., the strongest reception level, greatest degree of networking or connectivity, etc. The HeNB only uses the resource assignments from the selected eNB.

If the resource information broadcasted by neighboring cells is not contradictory, then the HeNB configures itself according to the broadcasted resource information (step 830).

Alternatively, if the HeNB selects wire-line network configuration, then at step 832, the HeNB initiates communications with a RAU via the previously established network connection. The RAU may be located in the Core Network, or alternatively, may be located at a nearby eNB. Accordingly, in one embodiment, the request is transmitted via the previously established network connection to the RAU. In one variant, the request is transmitted to the Core Network, and forwarded to a RAU entity. Alternately, the request may be transmitted to the Core Network, prompting a response containing an address for one or more RAUs (which the HeNB may directly connect to). In another such variant, the HeNB scans a nearby eNB, and determines an appropriate address by decoding one or more system information elements.

The HeNB then transmits a request for radio resource to the RAIL Responsive to the resource request, the RAU may transmit resource allocation information directly to the HeNB. The HeNB can than proceed to select one or more of the identified physical resources for its permanent downlink signals. The identified resource allocation information may be either a dedicated resource, or a new shared resource.

Exemplary LTE Resource Allocation Unit (RAU) Methods—

Figure 9:
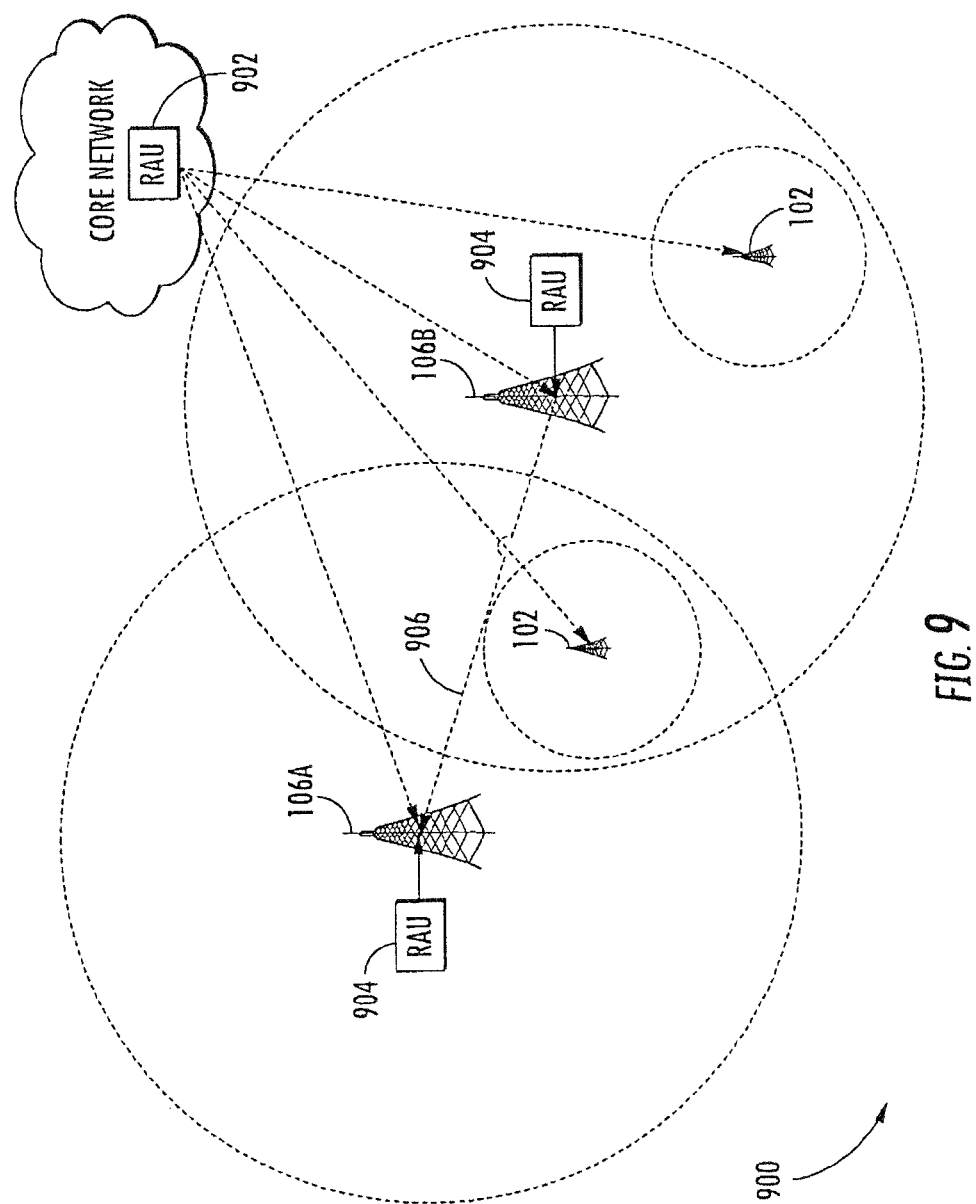
FIG. 9 is a graphical illustration of one embodiment of an LTE network according to the invention comprising a Core Network, a plurality of enhanced-NodeBs (eNBs), and a plurality of HeNBs, including exemplary distributions of Resource Allocation Units (RAUs).

Referring now to FIG. 9, an exemplary LTE network 900 is illustrated having multiple RAUs for providing resource allocation services and minimizing Core Network overhead, according to the principles of the invention. The RAU system of FIG. 9 includes a first central decision making RAU 902 resident at the Core Network that is directly controlled by the network operator (or its proxy). The exemplary system also includes many secondary or distributed "decision-making" RAUs 904 resident within eNBs 106 of the LTE RAN. It will be appreciated, however, that while a master/slave type RAU architecture is shown in FIG. 9, this approach is not a requirement of the invention; i.e., a peer-to-peer (P2P) or other arrangement may be used if desired.

The distributed RAUs 904 are shown implemented within eNBs 106. These distributed RAUs can locally control resource assignments to HeNBs 102, thereby substantially or even completely eliminating HeNB/Core Radio resource messaging exchanges. Each distributed RAU manages its resources independently. Consequently, if a HeNBs receives broadcast information from two or more eNBs, the HeNB may identify conflicting resource assignments. For example, a first eNB 106A may allocate one time-frequency resource as a dedicated resource, whereas a second eNB 106B may have assigned the same time-frequency resource for shared operation. The first and second eNB may be isolated from one another, without conflict during normal operation. However, any new HeNB operating in an overlapping coverage area of the first and second eNB will not be able to use the conflicted resource without interfering with either the first or second eNB.

Accordingly, distributed RAU's 106 may negotiate with one another to resolve contradictory time-frequency resource assignments. In one embodiment, distributed RAUs may directly access one another, either through Core Network infrastructure, or alternately, via LTE RAN dedicated communication links 906. Furthermore, it is appreciated that in certain scenarios, changes localized to a pair or group of eNBs to serve new HeNBs 102 may have multiple "rippling" effects throughout the network. Accordingly in some cases, the HeNB may be required to operate with limited capacity, or in some severe cases, to not operate at all, so as to avoid significant broader network operational disabilities. Alternatively, a centralized RAU 902 may be used where required to resolve resource allocations which are overly complex or beyond the capability of a HeNB or eNB.

In one embodiment, the central RAU 902 controls access rights for a large number of HeNBs 102, e.g., all HeNBs for a network operator within a city, zone, or country. In one such embodiment, the centralized RAU, has overriding authority to resolve any contradictory resource allocations. Furthermore, in some cases a central RAU may be required to service HeNBs which are not serviceable by standard methods, such as where they are not within the coverage of eNBs.

Figure 10:
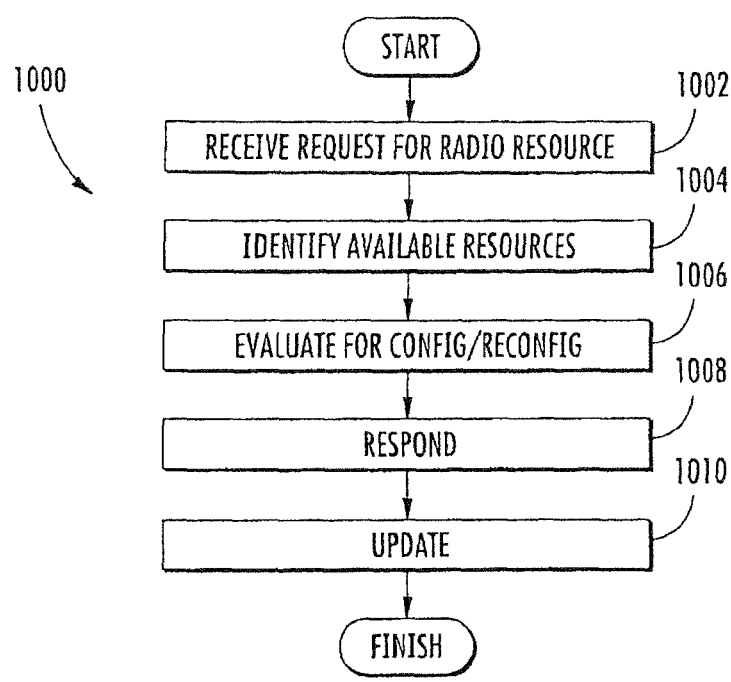
FIG. 10 is a logical flow diagram of an exemplary embodiment of the generalized process for assigning resources to a femtocell according to the invention.

Referring now to FIG. 10, one embodiment of a generalized method of operation 1000 of the RAU architecture previously described (for both centralized and localized embodiments) is now discussed in greater detail. While the following discussion is generally applicable to either centralized or localized implementations of RAU operation, it is appreciated that various implementations of RAU operation will differ significantly based on: the number of HeNBs handled, the number of radio resources, spectrum restrictions, etc. For example, a localized RAU will typically manage a small number of HeNBs, within a limited amount of spectrum. In contrast, a centralized RAU may handle hundreds, or thousands of HeNBs, across multiple ranges of spectrum, in both licensed and unlicensed spectrum, etc.

At step 1002, the RAU has received the request for a radio resource. The RAU decodes the listing of occupied resources as detected by the HeNB 102. In the exemplary LTE system, this listing includes a listing of Cell IDs. The listing of decoded Cell IDs is separated into Cell IDs of eNBs 106 and Cell IDs of HeNBs. The Cell IDs of macrocells are assumed to be a permanent fixture of the requesting HeNB's environment, and will not change. The Cell IDs of neighboring HeNBs are assumed to be temporary fixtures of the HeNB's environment, and may change nomadically, erratically, periodically, or not at all.

In some embodiments, a RAU may opt to redirect a radio resource request to another RAU. For example, a HeNB 102 which is unaware of a nearby RAU 904 located at an eNB 106 may request a resource from a Core Network RAU 902. The Core Network RAU may analyze the listing of Cell IDs provided by the HeNB, and determine that the HeNB would be better served by the nearby RAU situated at an eNB.

At step 1004, the RAU identifies the available resources based on the indicated Cell IDs. In one exemplary implementation, the available resources may be stored and recalled in a time-frequency grid or other format. The RAU may also be configured to identify contradictions between multiple time-frequency grids, such as may occur when a requesting HeNB 102 is in an area of overlap between two otherwise isolated eNBs 106 or HeNBs.

At step 1006, the RAU evaluates the radio resources for configuration or reconfiguration. Several criteria for radio resource selection may be used by the network operator. Such criteria may include for example maximizing data rates, minimizing data rates, bandwidth consumption, supporting varying levels of quality of service (QoS) for various HeNBs 102, maintaining certain security requirements, maximizing revenue or profit, etc. Additionally such criteria may be dependant from the contract between the HeNB operator/owner and the operator of the cellular network. For example, a HeNB with a low-budget tariff (e.g., residential) obtains a smaller bandwidth compared to a HeNB with a business tariff for, e.g., an office building. For instance, a limited data pipe shared between eNBs 106 and HeNBs in a region may be preferentially served to eNBs, therefore HeNBs may be assigned resources to support high data rates only during periods of low network usage.

In another example, the RAU may determine that a particular eNB may have too many HeNBs in its vicinity, and the RAU may opt to deny service to additional HeNBs which request a frequency in that eNB's general vicinity.

At step 1008 of the method 1000, the RAU generates a response to the HeNB 102. This response may be either a grant of resources, or a denial of resources. In a grant of resources, the HeNB identifies configuration parameters, thus enabling HeNB operation. In a denial of service the RAU may simply return a denial, or in another embodiment, the denial message may include a hold-off time, such that the HeNB may request access at a scheduled later time. The hold-off time otherwise may be determined within logic of the HeNB according to any number of different possible schemes (e.g., retry again in one minute, and then every one minute thereafter until a grant is received, or "n" retries have been completed without success).

In one embodiment of the invention, the aforementioned configuration parameters describe a resource (e.g., time-frequency) grid which flexibly allocates spectral resources to a number of HeNBs 102 with overlapping coverage areas. The time-frequency grid is separated into at least two (2) areas: one area with resources for dedicated resources 302, and one or more flexibly configured areas 304 (e.g., dedicated or shared, uplink or downlink, user specific or broadcasted, restrictions, etc.).

In another variant, the configuration parameters may include HeNB specific information, such as an assignation of shared or dedicated resources for the transmission of permanent downlink signals, or restrictions to areas of shared resources. For example, to maintain a minimum level of service, each HeNB may be guaranteed a limited amount of usage of the dedicated resources 502.

In yet another example, in some cases dedicated resources may be asymmetrically assigned to preferentially serve one HeNB over another, such as may be useful for achieving business goals or revenue/profit optimization.

In some cases, multiple options may be provided for HeNB-specific info information. For example, an RAU may specify multiple possible shared or dedicated resources for transmission of user data. Such multiple options may be useful in situations where the RAU may have multiple possible resources available for use, and where the HeNB may preferentially pick one resource over another so as to, inter alia, compensate for poor localized RF conditions, reduce power consumption, account for equipment outages or maintenance, etc.

In some cases, multiple options may be provided for "communal" HeNB 102 information. For example, an RAU may specify multiple restrictions for different ones of shared resources. Accordingly, the HeNB may provision service to varying levels of shared resources (e.g., guaranteed minimum or maximum data rates, voice only, data only, public access only, etc.), based on specific HeNB capabilities.

At step 1010, the RAU updates its internal table or other data structure with the new HeNB Cell ID, and its configuration information. In some cases, the RAU may also update other affected cells. For a HeNB 102 which was denied service, the RAU may opt not to record its entry. The RAU may also record the denied HeNB along with a time stamp, or number indicating number of denials (for use in algorithms ensuring fair HeNB service or identifying hardware or software malfunctions or "bugs"). The RAU may also record the denied HeNB and any neighboring HeNB cell IDs, such that when a neighboring HeNB is powered down, the denied HeNB may be offered service.

Femtocell Apparatus—

Figure 11:
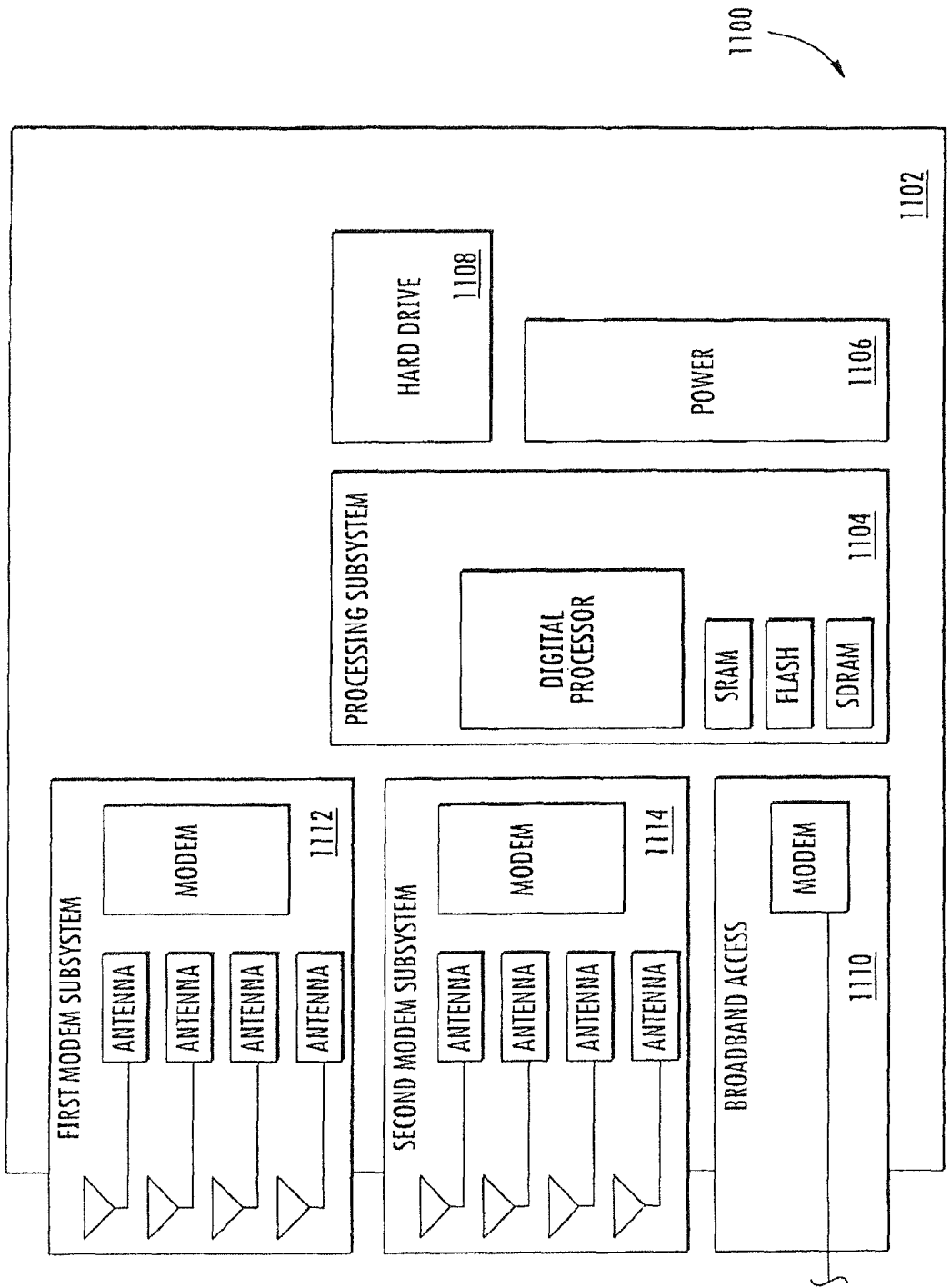
FIG. 11 is a block diagram of one embodiment of a femtocell apparatus configured in accordance with the principles of the present invention.

Referring now to FIG. 11, exemplary femtocell apparatus 1100 useful in implementing the functionality previously described above is illustrated and described. The femtocell apparatus 1100 of the illustrated embodiment generally takes the form factor of a stand-alone device for use in premises, although ocher form-factors (e.g., server "blades" or cards, dongles, roof-mounted units, etc.) are envisaged as well. The apparatus of FIG. 11 includes one or more substrate(s) 1102 that further include a plurality of integrated circuits including a processing subsystem 1104 such as a digital signal processor (DSP), microprocessor, gate array, or plurality of processing components as well as a power management subsystem 1106 that provides power to the femtocell 800.

The processing subsystem 1104 includes in one embodiment an internal cache memory, or a plurality of processors (or a multi-core processor). The processing subsystem 1104 is preferably connected to a non-volatile memory 1108 such as a hard disk drive (HDD), as well as a memory subsystem which may comprise SRAM, Flash, SDRAM, etc. The memory subsystem may implement one or a more of DMA type hardware, so as to facilitate rapid data access.

The exemplary apparatus 1100 will, in some embodiments, implement some form of broadband access. In the illustrated embodiment, the broadband access is provided by a DSL connection (i.e., via DSL subsystem 1110), although other interfaces may be used in place of or in combination with the DSL subsystem 1110 shown. The digital portion of DSL processing may either be performed in the processor 1104, or alternatively in a separate DSL processor (not shown). Further, while a DSL broadband connection is illustrated, it is recognized by one of ordinary skill that other broadband access schemes such as DOCSIS cable modem, T1 line, WiMAX (i.e., IEEE Std. 802.16), ISDN, MOS, microwave link, satellite link, etc. could be readily substituted or even used in tandem with the aforementioned DSL interface. DSL has the advantage of being low cost and generally ubiquitous, and carried over copper-based telephony infrastructure which is currently widely distributed throughout the population.

In one exemplary embodiment, the femtocell apparatus 1100 includes two RF modem subsystems. The first wireless subsystem 1112 enables the femtocell to search neighboring cell RF transmissions (e.g., macrocell, or femtocell). The second modem subsystem 1114 enables the femtocell to provide service to subscriber UE. It is readily appreciated that in some embodiments of the invention, two subsystems are not required. For example, a femtocell apparatus which only performs standalone self-configuration, or wire-line network-based configuration, would not require the first wireless subsystem 1112. Furthermore, it is appreciated that in some embodiments, a femtocell may provide multiple RF modem subsystems to provide, inter cilia, multi-mode operation (e.g. GSM, GPRS, UMTS, and LTE) over multiple distinct air interfaces.

The first modem subsystem 1112 includes a digital modem, RF frontend, and one or more antennas. It is recognized that in some embodiments that it may be desirable to obviate some of the components presently illustrated (such as RF frontend), or alternatively, the discrete components illustrated may be merged with one another to form a single component. In one exemplary embodiment, the first wireless subsystem 1112 operates as a standard LTE UE modem. In other alternate embodiments, the first wireless subsystem 1112 uses a secondary wireless interface dedicated for radio access network coordination. For example, the first wireless subsystem may interface with a UMTS macrocell (i.e. non-LTE based) for HeNB configuration.

The second modem subsystem 1114 includes a digital modem, RF frontend, and one or more antennas. It is recognized that in some embodiments, it may be desirable to obviate some of the components presently illustrated (such as RF frontend), or alternatively, the discrete components illustrated may be merged with one another to form a single component. While a single RF frontend is illustrated between the exemplary femtocell apparatus 1100 and a UE 104, it is appreciated that multiple RF front ends may exist to support multiple simultaneous UEs and air interfaces, or alternatively implement MIMO aspects of operation.

In one exemplary implementation, the femtocell apparatus 1100 disclosed above further includes apparatus for scanning for Cell IDs broadcasted in occupied radio resources. Accordingly, the apparatus responsible for scanning radio resources must receive the radio frequency signal and at least partially demodulate neighboring cell messages (e.g., those sent on the broadcast control channel (BCCH)). The femtocell may be configured to fully demodulate the downlink power signal from the cellular network. Alternatively, for a wireless system which does not require full demodulation to extract the Cell ID, the signals can be demodulated only as far as is required to extract the received Cell ID.

In some wireless networks, pre-configuration data is required in order to complete the demodulation process. In one such exemplary embodiment, this demodulation data is referenced to location identification. For instance, the femtocell can obtain an ID of the country in which the scanned mobile communication system is running (e.g., the mobile country code or MCC) via the wireless interface. Alternatively, the femtocell can select a set of parameters from a stored table or a hard-coded set of parameters. As yet another alternative, the femtocell may actively query its location from an external entity (e.g. a network provider, website, third party server, etc.) via the broadband subsystem.

The femtocell should also be able to seamlessly operate with a RAU disposed in either a nearby device (904), or resident at the Core Network (902). In one such embodiment, the femtocell and RAU are connected via a broadband type access network (wired or wireless). In another embodiment, the femtocell and RAU are connected via a first or second radio modem subsystem (e.g., cellular interface). In both embodiments, the connection allows the RAU to control spectral usage of the exemplary femtocell. Therefore, if the femtocell is unable to operate with the resources specified by the resource allocation message, the femtocell must desist from receiving and or transmitting, or at least defer to other transmitters.

Resource Allocation Unit (RAU) Apparatus—

Implementation of the resource allocation unit (RAU) may be accomplished in hardware and/or software. The functionality of the RAU may be implemented as a separate entity in the Core Network (902), or the functions may be included in other existing entities such as a Serving GPRS Support Node (SGSN). Furthermore, in some embodiments, the functionality of the RAU may be implemented within either a macrocell (e.g. eNB 106) 904, or a femtocell (e.g. HeNB 102). In the exemplary embodiment described subsequently herein, the RAU entity is implemented within software embodied in a computer readable medium (e.g., HDD, memory, etc.) and executable by a processing device (e.g. a digital processor/DSP, microprocessor, etc.), although this is not a requirement of practicing the invention.

The RAU manages and/or stores a table of spectral resources, and their use with respect to a group of one or more cells (e.g., femtocells, and/or macrocells). In one embodiment, the RAU manages the currently available spectral resources (e.g., frequency, bandwidth, code, etc.), currently occupied spectral resources, and any limitations on occupied spectral resources. In this case, the RAU manages a time-frequency grid comprised of time-frequency resources, where each resource is further allocated for dedicated or shared use as previously described. For each of the dedicated resource listings, the RAU stores its current state. For example, each dedicated resource listing may be assigned one of the following: (i) one cell ID, and (ii) "unoccupied and available" status, or (iii) "not available" status. For each of the shared resource listings, the RAU may or may not store additional usage information. For example, each shared resource listing may be assigned: (i) no restriction, (ii) a guaranteed minimum data rate, (iii) a guaranteed maximum data rate, (iv) voice only, (v) data only, (vi) public access only, etc.

While the present embodiment suggests the storage of data local to the RAU functionality, it is appreciated that remote storage of the data may be utilized as well. For example, a network operator. RAU may maintain entries for a large number of femtocells. The size of such a database would typically be handled at a remote storage facility, but this is not a requirement, and in fact the data may be distributed across two or more storage entities if desired.

Furthermore, it is understood that multiple methods for obtaining currently used resources may be utilized. For example these methods may include periodic or event-driven refresh and reclamation procedures. Reclamation of valuable spectrum may be critical for nomadic femtocell operation where the previously assigned femtocell may experience, e.g. a "dirty" power off sequence.

During operation, a RAU assigns spectral resources to requesting femtocells, based on information from the received resource request (e.g., a requested bandwidth). While in an exemplary embodiment, the primary input for resource allocation is from the femtocell, it is appreciated that other inputs may be necessary and further may override the femtocell resource request. In certain circumstances, the RAU may determine that the femtocell resource request is to be ignored, and no such resource is allocated to the femtocell. Such a circumstance may occur due to network burden, business accounting (e.g., non-payment of a monthly bill), improper/unsupported hardware, security, etc. Furthermore it is appreciated that the resource pool selected from by the RAU may not be a comprehensive pool of resources (such limitations may be imposed for hardware/software compatibility issues, security issues, business issues etc.).

Example Operation

The following operational example illustrates one or more of the various aspects of the present invention. Referring back to the time-frequency grid 300 of FIG. 3, a first, second, third, and fourth HeNB 102 are currently operating. Each HeNB has identified a corresponding shared resource 302 for permanent downlink signaling. All four HeNBs are sharing communal resources for flexible data usage. A fifth HeNB is powered on and needs to obtain resources for operation. The following two scenarios represent self-configuration and network-based configuration operation, based on pre-configured or derived settings of the fifth HeNB.

If the fifth HeNB 102 is set for or self-determines that it should invoke self-configuration, then the HeNB scans the air interface within the configured frequency range for synchronization signals from neighboring HeNBs. The HeNB detects that all currently available resources are occupied; the time-frequency grid 300 has already been allocated with respect to each of the shared resources for permanent downlink signaling. The HeNB accordingly then switches to RAU assisted self-configuration, and scans for the cell IDs of its neighboring HeNBs. The HeNB sends a resource request message to the Resource Allocation Unit (RAU). The resource request message includes the cell IDs of surrounding HeNBs.

The RAU has two possibilities: the RAU may assign a dedicated resource 502 to the HeNB 102, or the RAU may transmit a reconfiguration message to all (i.e., the first, second third, fourth), or a subset of, the extant HeNBs.

If the RAU assigns a dedicated resource 502 to the fifth HeNB, then the RAU must update the time-frequency grid 300 for all HeNBs (first, second, third, fourth, and fifth) indicating that the time-frequency resource allocated for the fifth HeNB is no longer available for shared resource operation or user data. In other scenarios, the RAU may deny service to the fifth HeNB, to continue its existing resource allocations.

Alternately, the RAU may open a new set of shared resources. In this case, the RAU transmits reconfiguration messages to all HeNBs 102 identifying new shared time-frequency resources; each HeNB accordingly reassesses to adjust their operation. Each HeNB which is assigned a new resource transmits permanent downlink signals on its newly assigned resource, and the configuration of the community of HeNBs is ended.

If the fifth HeNB 102 is set for or otherwise determines that network-based configuration is appropriate, then the fifth HeNB will align itself with the network based on a wireless or wire-line connection.

If the fifth HeNB 102 selects wire-line operation, it directly contacts the RAU for an updated time-frequency grid. If the RAU identifies a series of possible shared resources, then the fifth HeNB may select one of the possible shared resources, and commence operation. If the RAU identifies a dedicated resource, then the fifth HeNB commences operation with the dedicated resource.

Alternately, if the fifth HeNB 102 performs wireless operation, it scans the air interface within its pre-configured frequency ranges for system information from neighboring eNBs 106. If the HeNB identifies contradictory configuration information, then the HeNB informs the RAU (or RAUs). The RAU establishes appropriate configuration parameters. The configuration parameters are broadcast by the LTE eNBs. Each of the HeNBs then updates their parameters accordingly.

Business Methods and Rules Engine—

It will be recognized that the theregoing network apparatus and methodologies may be readily adapted to various business models. For example, in one such model, a service provider/network operator may provide an enhanced-capability femtocell (such as that described previously herein) to customers willing to pay a premium, or as an incentive for its higher-tier customers.

In another paradigm, certain strategic users could be selected to receive such enhanced-capability femtocells based on inter alia their subscription level, rate of usage, geographic location, etc., even in exchange for consideration from the network operator (e.g., a rebate or reduction of their monthly service fees if they operate the femtocell in accordance with the network provider policies).

The aforementioned network apparatus and methodologies may also be readily adapted for operation in accordance with an underlying business rules "engine". This business rules engine may comprise for example a software application and/or hardware, and is implemented in one embodiment as a separate entity at the Core Network, or alternatively within an existing entity residing at the Core Network or other network management process (including the RAU (s)).

In one embodiment, the business rules engine takes into account the revenue and/or profit implications associated with providing resources to one or more user-operated femtocells so that the resource allocation to the femtocell does not negatively impact network user experience, or the services that are able to be provided to users on the network via the geographically fixed base stations. Accordingly, the exemplary business rules engine can modify the behavior of the system at specific steps described in the methodologies above in order to accomplish one or more economic or operational objectives for the network operator.

For instance, evaluation of the request from a femtocell for resources (e.g., frequency spectrum) may include an analysis of the incremental cost, revenue, and/or profit associated with the various allocation options (i.e., allocation to the requesting femtocell, or denial of the request and allocation to another femtocell, or a static base station). These "business rules" may be imposed e.g., at time of resource request and then maintained for a period of time (or until an event triggering a re-evaluation occurs), or alternatively according to a periodic or even randomized model. In another variant, the party who owns the resources is tasked with making business-related decisions.

As yet another alternative, the femtocell may be equipped with logic (e.g., a business rules engine or component thereof, such as a client portion of a distributed application) that is configured to analyze and make business or operational decisions relating to the business model between the client device (e.g., UE) and the femtocell. For instance, the femtocell may preferentially process or allocate resources to certain requesting users based on their status (e.g., as existing subscribers of the service provider associated with the Core Network, the type of service requested and revenue/profit implications associated therewith, etc.)

Myriad different schemes for implementing dynamic allocation of resources will be recognized by those of ordinary skill given the present disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method, comprising:
   at a femtocell apparatus:
      scanning to determine available radio resources; and
      selecting between a self-configuration mode and a network-based configuration mode for the femtocell apparatus, wherein the selecting is based on a message received from a network,
         wherein in the self-configuration mode, the femtocell apparatus selects at least one available resource as a downlink,
         wherein in the network-based configuration mode, the femtocell apparatus receives a downlink radio resource from the network.

2. The method of claim 1, wherein according to the selected configuration mode, the femtocell identifies one or more of the available radio resources for signaling.

3. The method of claim 2, wherein the femtocell is assigned control of the one or more of the available radio resources for signaling.

4. The method of claim 2, wherein the femtocell assumes control of the one or more of the available radio resources for signaling.

5. The method of claim 1, wherein the network comprises a Long Term Evolution (LTE) cellular network and the femtocell apparatus comprises a Home evolved Node B (HeNB).

6. The method of claim 1, wherein the network periodically provides updated network parameters to the femtocell, whether in the self-configuration mode or the network-based configuration mode.

7. The method of claim 1, wherein the method is performed during a periodic scan by the femtocell apparatus.

8. A femtocell capable of operating within a wireless network, the femtocell comprising:
   a memory that includes executable instructions; and
   a processor coupled to the memory, wherein the processor executing the instructions cause the processor to perform operations, comprising,
      scanning to determine available radio resources, and
      selecting between a self-configuration mode and a network-based configuration mode for the femtocell apparatus, wherein the selecting is based on a message receive from a network,
         wherein in the self-configuration mode, the femtocell selects at least one available resource as a downlink, and
         wherein in the network-based configuration mode, the femtocell apparatus receives a downlink radio resource from the wireless network.

9. The femtocell of claim 8, wherein, according to the selected configuration mode, the femtocell identifies one or more of the available radio resources for signaling.

10. The femtocell of claim 9, wherein the femtocell is assigned control of the one or more of the available radio resources for signaling.

11. The femtocell of claim 9, wherein the femtocell assumes control of the one or more of the available radio resources for signaling.

12. The femtocell of claim 8, wherein the network comprises a Long Term Evolution (LTE) cellular network and the femtocell apparatus comprises a Home evolved Node B (HeNB).

13. The femtocell of claim 8, wherein the wireless network periodically provides updated network parameters to the femtocell.

14. The femtocell of claim 8, wherein the is performed during a periodic scan by the femtocell apparatus, whether in the self-configuration mode or the network-based configuration mode.

15. The femtocell of claim 8, further comprising:
a wireless subsystem, wherein the wireless subsystem performs operations related to the scanning for the available radio resources.

16. A non-transitory computer readable storage medium that includes a executable instructions, wherein the instructions, when executed by a processor, cause the processor to perform operations, comprising:
scanning to determine available radio resources; and
selecting between a self-configuration mode and a network-based configuration mode for the femtocell apparatus, wherein the selecting is based on a message received from a network,
wherein in the self-configuration mode, the processor selects at least one available resource as a downlink, and
wherein in the network-based configuration mode, the femtocell apparatus receives a downlink radio resource from the wireless network.

17. The non-transitory computer readable storage medium of claim 16, wherein, according to the selected configuration mode, the operations further identify one or more of the available radio resources for signaling.

18. The non-transitory computer readable storage medium of claim 17, wherein the processor is assigned control of the one or more of the available radio resources for signaling.

19. The non-transitory computer readable storage medium of claim 17, wherein the processor assumes control of the one or more of the available radio resources for signaling.

20. The non-transitory computer readable storage medium of claim 16, wherein the non-transitory computer readable storage medium is included in a femtocell apparatus of a Long Term Evolution (LTE) cellular network.

* * * * *